April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 1

INVENTOR
R. C. AVERY
BY
James W. Falk
ATTORNEY

INVENTOR
R. C. AVERY
BY
[signature]
ATTORNEY

April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 3

INVENTOR
R. C. AVERY
BY Jones & Falk
ATTORNEY

April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 4

INVENTOR
R.C.AVERY
BY [signature]
ATTORNEY

INVENTOR
R. C. AVERY
BY Louis W. Falk
ATTORNEY

April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 6

INVENTOR
R. C. AVERY
BY
James W. Falk
ATTORNEY

April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 7

INVENTOR
R. C. AVERY
BY [signature]
ATTORNEY

April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 8

INVENTOR
R.C.AVERY
BY
ATTORNEY

April 28, 1964

R. C. AVERY

TELEPHONE SYSTEM WITH SELECTIVE CODE COMPRESSION AND REGISTER RECYCLE 3,131,262

Filed July 27, 1960

18 Sheets-Sheet 9

INVENTOR
R. C. AVERY
BY
James W. Falk
ATTORNEY

INVENTOR
R. C. AVERY
BY
[signature]
ATTORNEY

April 28, 1964 R. C. AVERY 3,131,262
TELEPHONE SYSTEM WITH SELECTIVE CODE
COMPRESSION AND REGISTER RECYCLE
Filed July 27, 1960 18 Sheets-Sheet 11

INVENTOR
R. C. AVERY
BY [signature]
ATTORNEY

INVENTOR
R. C. AVERY
BY
[signature]
ATTORNEY

INVENTOR
R. C. AVERY
BY
ATTORNEY

INVENTOR
R.C. AVERY
BY [signature]
ATTORNEY

April 28, 1964 R. C. AVERY 3,131,262

TELEPHONE SYSTEM WITH SELECTIVE CODE COMPRESSION AND REGISTER RECYCLE

Filed July 27, 1960 18 Sheets-Sheet 15

INVENTOR
R. C. AVERY
BY
James Falk
ATTORNEY

INVENTOR
R. C. AVERY
BY
ATTORNEY

INVENTOR
R. C. AVERY
BY
ATTORNEY

INVENTOR
R. C. AVERY
BY
James W Falk
ATTORNEY 3,131,262
Patented Apr. 28, 1964

3,131,262

TELEPHONE SYSTEM WITH SELECTIVE CODE COMPRESSION AND REGISTER RECYCLE

Robert C. Avery, Jackson Heights, N.Y., assignor to Bell Telephone Laboratories, Incorporated, New York, N.Y., a corporation of New York Filed July 27, 1960, Ser. No. 45,706
10 Claims. (Cl. 179—18)

This invention relates to telephone systems employing automatic switching equipment for the establishment of communication paths. In particular, the invention provides new and improved means for handling customer dialed toll calls.

At the present time, there are plans for converting existing switching equipment to handle direct distance dialed calls, hereinafter referred to as DDD calls. The directing codes or digits required for such toll switching purposes have been arrived at by dividing the nation into areas, the size of each area generally depending upon the number of telephone stations therein, and each area being assigned a 3-digit area code. These 3-digit area codes are added to the directory designations of each subscriber connected to the system. In order to distinguish the 3-digit area codes of a subscriber's designation, the area code designations have been selected so as to have the second digit, of the 3 digits comprising each area code, always a "1" or a "0." The first digit of an area code may be any digit except a "0" or a "1," the "0" being omitted since it might be confused with the digit "0" customarily dialed by a subscriber to reach an operator and the digit "1" being omitted to avoid the possibility of the false transmission of a "1" as the first digit through switchhook fumbling. The numbering plan currently in existence therefore provides that area codes may be X0X or X1X, where X is any of the digits 2–9 and in the third position may also include 0.

One of the requisites for processing customer toll dialing is that the equipment in local central offices must be capable of receiving and registering 10 or 11 digit designations and of retransmitting them to a toll switching system. Certain of the automatic telephone systems presently in use, for example systems of the panel and crossbar type, initially were designed to receive and register only 7 or 8 digits of a subscriber number. These systems have subsequently been modified by the addition of auxiliary senders. In general, an auxiliary sender circuit is common to a plurality of senders and is connectable thereto to provide additional register capacity in the event that a pretranslation of the first 3 digits indicates that the call is of a DDD variety.

In a typical local automatic switching telephone office, of the type known as a crossbar office, such as shown in United States Patent 2,235,803, granted to W. W. Carpenter on March 18, 1941, when a subscriber originates a call the calling line is automatically connected to an idle district junctor and to an idle subscriber sender. The subscriber sender receives and registers called line designations as dialed by the calling subscriber but is equipped to register a maximum of 8 digits. After the first 3 digits have been registered, identifying the office to which the call is directed, the sender is connected to an idle marker and passes these 3 digits to the marker. The marker translates the digits into a routing indication from which it derives information which it uses in selecting an idle trunk leading to the identified office and in connecting the selected trunk with the district junctor to which the calling line has already been connected. At the same time, the marker derives information required by the sender at the sending office as to the class of call, etc., which it passes back to the subscriber sender, followed by a release signal. From the class of call indication the subscriber sender determines the type of outpulsing to be used in controlling the called office, sets up the required type of control circuit passing by way of the district junctor and the selected outgoing trunk to the distant office and prepares the proper pulsing equipment. This control circuit, which is used for both testing the condition of the trunk and for transmitting the designation to the distant office, is usually called the "fundamental circuit."

United States Patent 2,867,690, granted to Charles O. Parks on January 6, 1959, discloses an auxiliary sender arrangement which may or may not be inserted in the fundamental circuit in accordance with whether the call is to another toll area, herein called a foreign area, or is to the local area. With the addition of such circuitry therefore, DDD calls may be handled by local offices which would otherwise have insufficient sender register capacity.

Prior to the institution of direct distance dialing in certain thickly populated areas of the country, for example, the area surrounding large cities, the density of telephone traffic required the establishment of special trunking facilities within the areas themselves, in spite of the fact that relatively short distances were involved. When the areas for direct distance dialing purposes were established, it was found necessary to divide such thickly populated areas, placing a portion thereof in one DDD area and other portions in other DDD areas. Utilization of the standard central office modifications wherein auxiliary sender registering equipment is used to aid in the establishment of calls between such DDD areas does not take advantage of the many existing specialized trunk circuits.

A large proportion of the DDD calls emanating from any one area is directed to adjacent DDD areas. It has been found that by distinguishing calls to adjacent DDD areas from calls to more remote DDD areas, it is possible to handle the majority of calls without requiring the use of auxiliary sender circuitry.

The present invention is designed to identify calls directed to predetermined areas and to expedite the handling thereof by routing them directly to the areas of destination and thereby avoiding the necessity for calling in auxiliary sender equipment. Because most of the existing local office equipment has been designed to register a maximum of 8 digit and direct distance dialed calls may require 10 or even 11 digits, an object of the invention is to provide a substitute for the auxiliary sender registers in the event the above-mentioned predetermined areas are dialed.

Another object of the invention is to recognize area designations of predetermined areas and to provide specialized handling of the connections required to establish the calls connected therewith.

Yet another object is to provide equipment having complete flexibility with respect to which area codes may be so handled.

The trend of telephone service indicates that in the future the numbering plan described hereinbefore may not furnish a sufficient number of discrete DDD areas in view of the anticipated volume of traffic. This being so, it is very likely that codes other than those currently employed, i.e., of the form wherein a "0" or "1" in the second or B digit position signifies a DDD call, may be adopted to identify area codes.

It is consequently another object of the invention to provide equipment with sufficient flexibility to include the decoding and specialized treatment of calls preceded by codes of the 1XX or ABX variety.

The problem of register capacity is presented not only where DDD calls are involved, but also where special prefixes are used in addition to local call designations, for example, the prefix "11." Should such prefixes be adopted to further identify the nature of DDD or other calls, as currently contemplated, the possible need for as many as 13 digit registers arises.

Still another object of the present invention is to furnish equipment that permits the utilization of existing equipment with a minimum of modification to render it operable irrespective of the number of digits handled.

One desirable method for increasing capacity of existing equipment, in order to have it accomplish additional functions not originally contemplated, is to use the same equipment more than once in any cycle of operation. To date, in order to increase the capacity of standard switching systems, such as the panel and crossbar, which were designed for 8 digit directory numbers, auxiliary senders have been added. With the addition of auxiliary senders discrimination had to be made between local and DDD calls. Where DDD calls were detected the auxiliary senders were connected. The present invention discriminates not only between local and DDD calls, but also between general DDD calls and DDD calls to preselected areas. In order to do this means are provided, when calls to the preselected areas are placed, for recycling the registers used for registering the first three digits of a dialed number, called the A, B, and C registers and registering the subsequently dialed office digits thereon.

The present invention features means operative upon detection of DDD area codes for seeking access to a decoder-translator whose function is to detect those calls destined for preselected areas and initiate specialized treatment thereof.

Circuits for reducing the number of registers needed to register a given number of digits are old in the art. Among these, are circuits having registers which alternately store a dialed number in one register section while a second section is transmitting a previously registered number, thereby making only two digit register sections necessary regardless of the number of digits involved. In such a circuit a digit register section may be restored in an interval required for the registration of one digit plus the interval between succeeding digits. Other circuits store some of the digits only and transmit others directly, thereby gaining additional time for restoration of the registers between uses.

A feature of the present invention is means for effecting the restoration of a plurality of register digit sections within the brief period between receipt of sequentially received digits.

Another feature resides in means activated upon detection of area codes for preselected areas, which recycle the A, B, and C registers to permit storage of subsequent digits before the fourth digit is received.

Another feature is the means whereby the area codes associated with remote DDD areas are detected, and auiliary senders called in, without the use of pretranslating equipment.

Still another feature of the invention is means for interrupting the marker start signaling apparatus upon determination that a DDD call is to one of a plurality of preselected areas.

Another feature of the invention is a group of high speed relay decoder-translator circuits which permit numerous area codes to be handled within an interdigital time period.

Another feature of the invention is a relay decoder-translator effective to rapidly perform decoding and translating functions with a minimum of circuitry and with high efficiency.

Another feature of the invention resides in means for automatically monitoring the code compression process and signaling the cause of failure if a failure should occur.

Basically, the invention employs a code compressor in conjunction with an automatic telephone switching system, to detect the registration of preselected DDD area codes in the A, B, and C registers of a sender. The compressor is connected to a register wherever a DDD number is detected by the presence of a "0" or "1" digit in the second, or B section, of the register. If the area code does not identify an adjacent area, and therefore is not among those preselected, an auxiliary sender is called in to handle the calls as in earlier circuits. If the area code identifies an adjacent area, and the code is therefore one of a preselected group of codes, the compressor initiates the establishment of a direct connection over trunking circuits to the area identified thereby and also recycles the A, B, and C sections of the register in time to permit registration of the fourth, fifth, and sixth digits therein. The circuitry is thus arranged to permit the decoding of codes on the first 3 registers and the recycling thereof during the interdigital time period.

The foregoing as well as additional objects and features will be clearly understood from the following description made in conjunction with the drawings wherein.

For purposes of description the present invention is disclosed as embodied in a typical crossbar switching system, such as described in the aforementioned Carpenter patent, 2,235,803, in cooperation with the auxiliary sender circuitry described in the aforementioned Parks Patent 2,867,690, modified as necessary to perform the functions and afford the features described in the foregoing as well as hereinafter. It should be understood, however, that the teachings herein are also applicable, with minor modifications, to panel systems.

Figures 1, 1A:
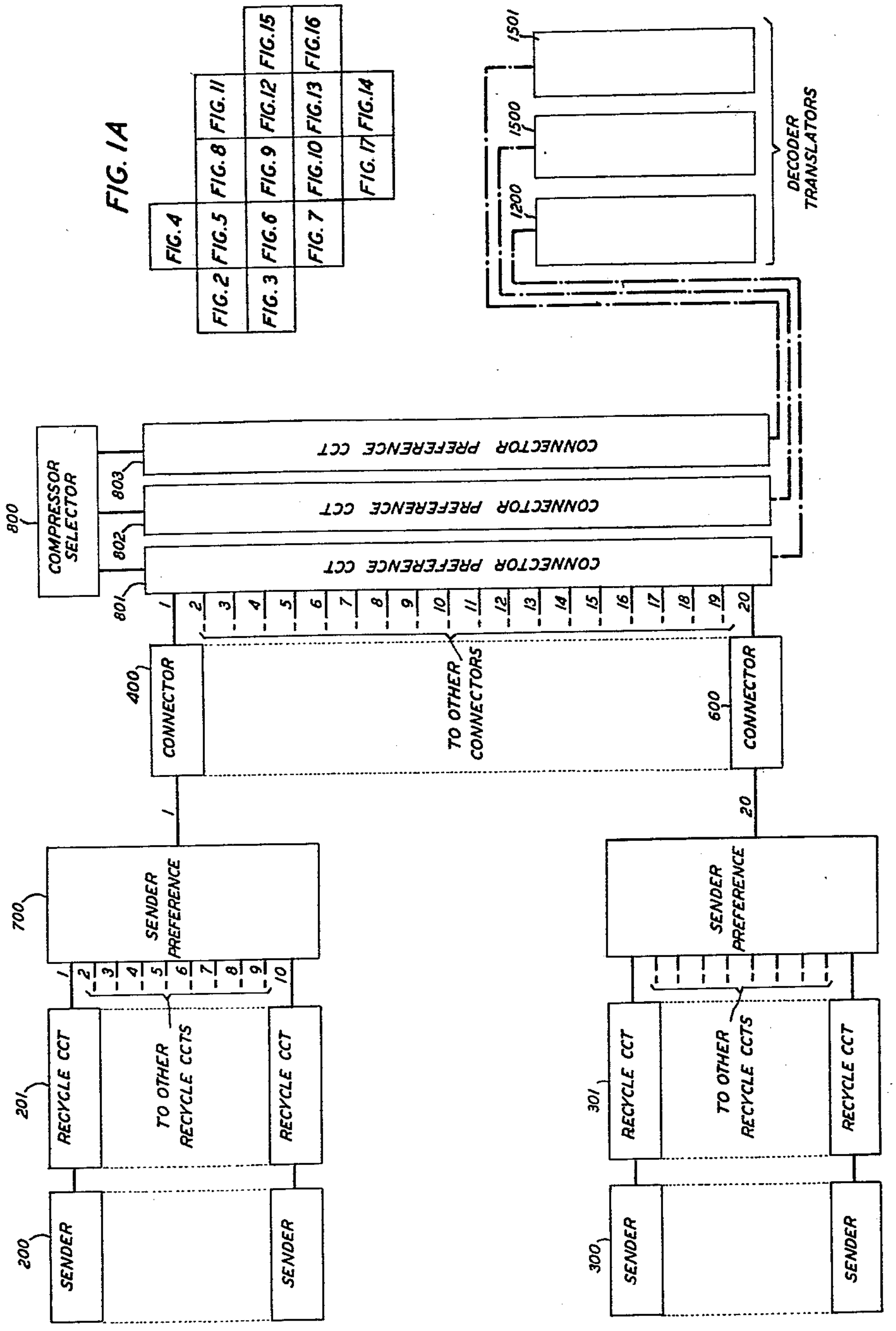
FIG. 1 is a block diagram of an embodiment of the invention.
FIG. 1A shows the manner in which the circuit schematic sheets should be arranged.

The basic circuit units and their functional interrelationships may be recognized and understood from a consideration of FIG. 1, wherein it may be seen that the illustrative embodiment contains circuitry for providing preselected area code compression for two hundred subscriber senders. Each individual sender 200 is connected to a distinct recycle circuit 201. A group of ten senders is served by one connector circuit 400 and access thereto is obtained via a sender preference circuit 700, individual thereto. Each connector circuit 400, in turn, has access to three decoder translators 1200, 1500, or 1501. In order to determine which connector will first be served and which compressor will be employed, connector preference circuits 801, 802, and 803, and compressor selector 800, are provided, respectively.

When any DDD code is dialed into a subscribed sender, the registration of the "0" or "1" in the B digit register activates the subscriber sender recycle circuit. Upon activation, the recycle circuit initiates opening of the marker start lead to prevent passage of these code digits thereto for translation or other operations; actuates the sender preference circuit thereby bidding for access to the common connector serving its sender group; and applies a start signal to the compressor selecting circuits to secure the services of an idle compressor. As will be noted in the following description, the latter two operations are performed coincidently in order to minimize the total operating time.

The sender preference circuits insure access to the connector serving their group of subscriber senders according to a predetermined order of preference among the senders in each group. Once association with a connector is achieved all connectors bid for access to an idle compressor by means of similar preference circuitry.

If the area code is one of a preselected group of codes (e.g., that of an adjacent area), it is translated into a discrete 2-out-of-5 signal by the decoder-translator and transmitted to the recycle circuit for subsequent use by the marker. If the area code does not fall within the preselected group, a request for association with an auxiliary sender is transmitted via the recycle circuit.

Before giving a detailed description of the operation of the circuit, the conventions employed in the associated drawings, FIGS. 2–17, will be explained to make the description more easily understood.

Figure 5:
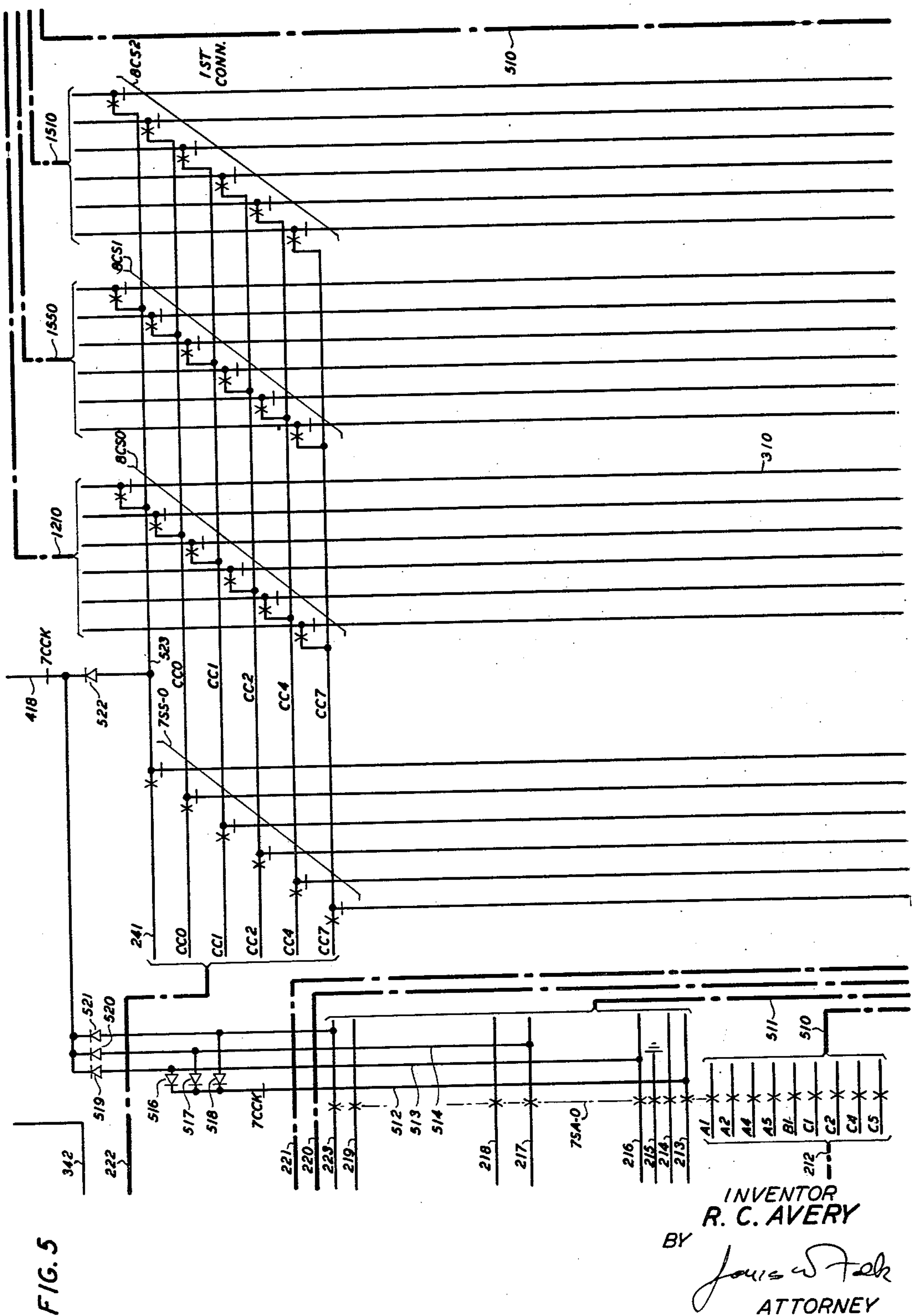
Figure 6:
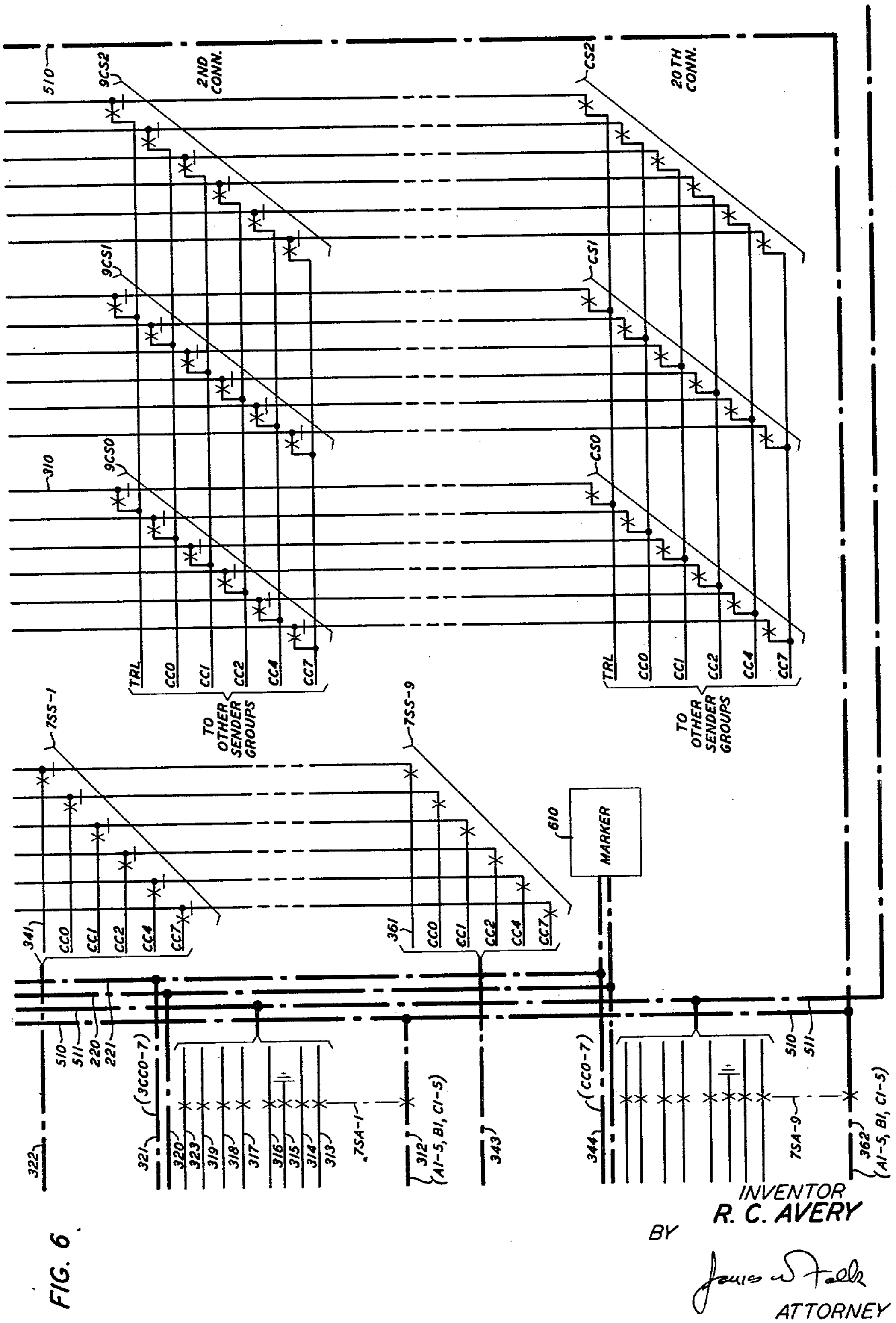
Figure 10:
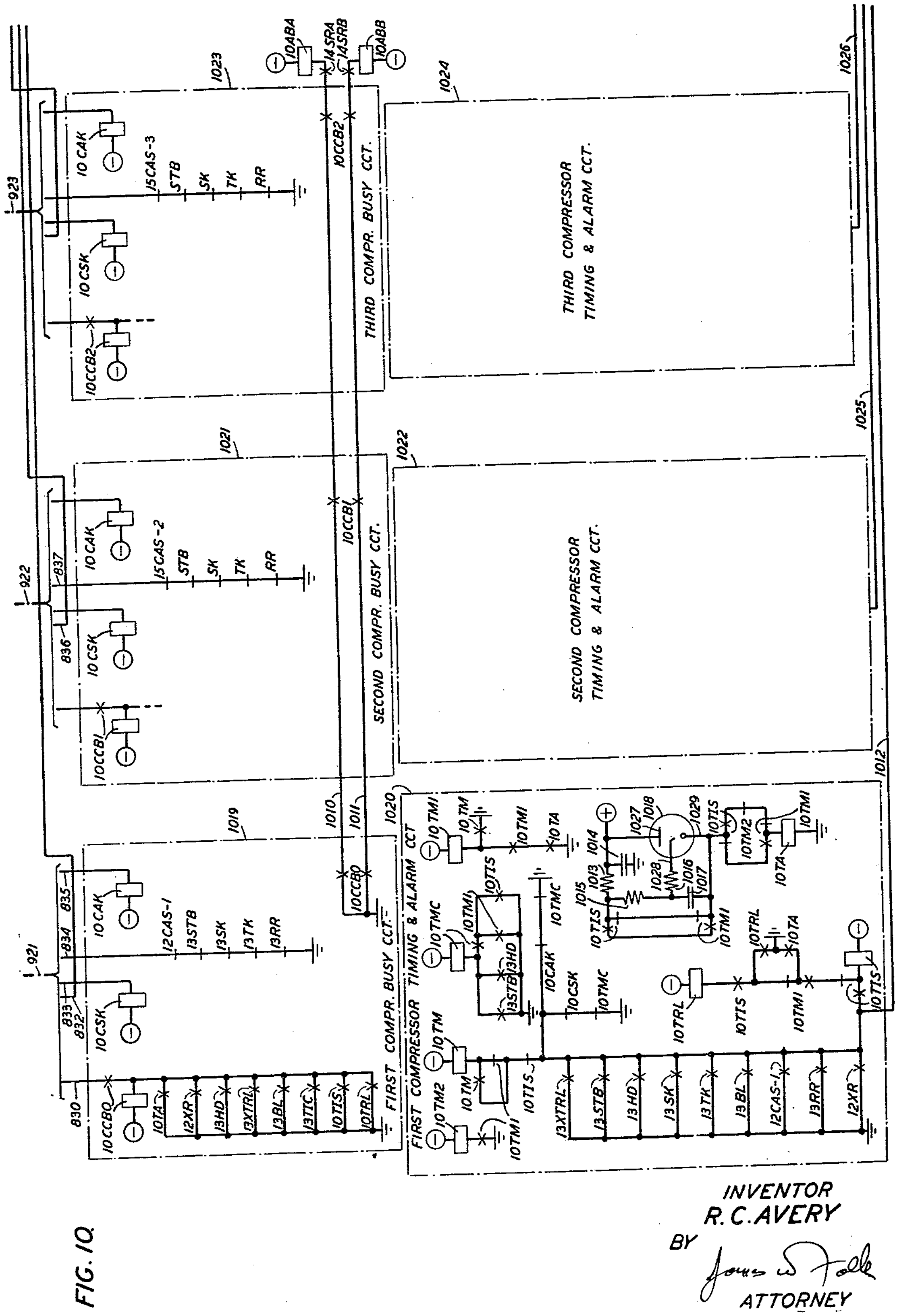
FIGS. 10–13, 15 and 16 are circuit schematics of the compressor arrangement including three decoder-translators which serve a block of 200 subscriber senders.

The detached contact method of illustration, now quite widely understood, has been adopted. In this method the relay winding is shown physically separated from the contacts controlled thereby. This permits placement of the contacts at locations in the circuit drawings where the functions they perform are visually pertinent and avoids the necessity of employing a large number of needlessly long connecting lines. With this system of representation, normally closed contacts are illustrated by a short line perpendicular to the conductor to which they are connected and normally open contacts are illustrated by a pair of diagonal lines forming an "X," intersecting the conductor to which they are connected. Contacts are identified by the same designation as the relay by which they are controlled, for example: FIGS. 5 and 6 contain a plurality of normally open contacts of relays 7SA– vertically disposed along the left-hand edges thereof; FIG. 10 contains a plurality of normally closed contacts associated with relays 12CAS–1, 13STB, 13SK, 13TK, and 13RR, connected in series between conductor 834 and ground; and FIG. 5 shows a plurality of transfer contacts associated with relays 8CS0, 8CS1, and 8CS2 in the upper right quadrant thereof.

Figure 2:
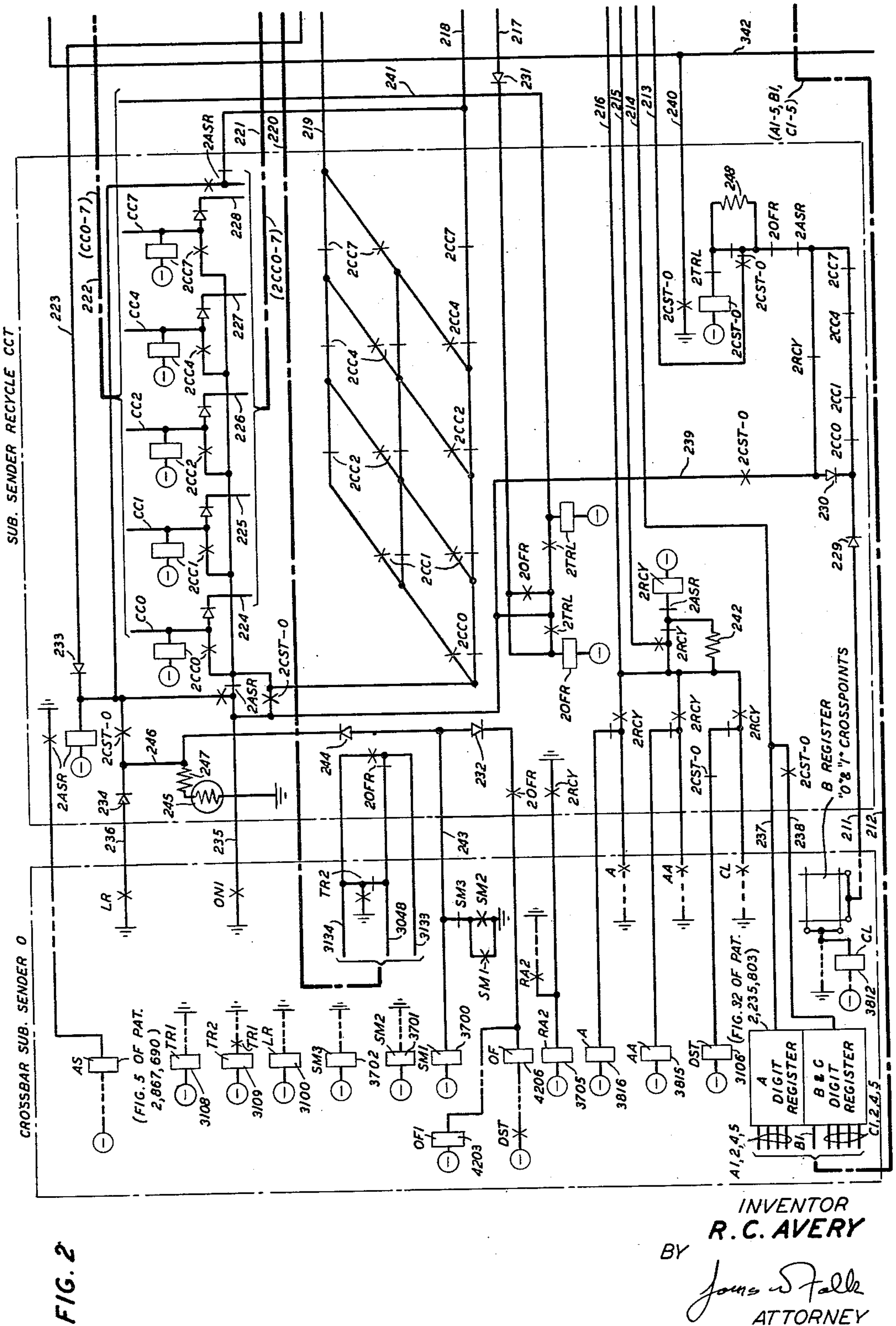
FIGS. 2 and 3 are circuit schematics of typical recycle circuits as connected for example to elements of a crossbar subscriber sender.

An additional feature of the drawing is that the relays, in addition to containing numerical designations which represent the figure in which they appear, also contain letter designations which, in many instances, are descriptive of the relay functions and which may be related thereto by reading the description. For example, the relay appearing in the lower right-hand corner of FIG. 2 is designated 2CST–0. This indicates that the relay appears in FIG. 2, has the function of "Compressor STart," and is part of the recycle circuit for subscriber sender "0."

It may also be noted that the elements in the subscriber sender circuit located on the left-hand side of FIG. 2 contain numerical designations which are distinct from their functional designations. In general, the numerical designations are identical to those appearing in the aforecited Patent No. 2,235,803. The only exception to this occurs in the case of relay AS, the counterpart of which appears in FIG. 5 of aforementioned Patent 2,867,690.

Further, in order to avoid duplication of drawings, in instances where circuitry is identical to that already present in the drawings, it has been illustrated as a box, labeled descriptively and having input and output leads identical to a similar box in which all circuit details are illustrated. Examples of this appear in FIGS. 2 and 3.

Figure 18:
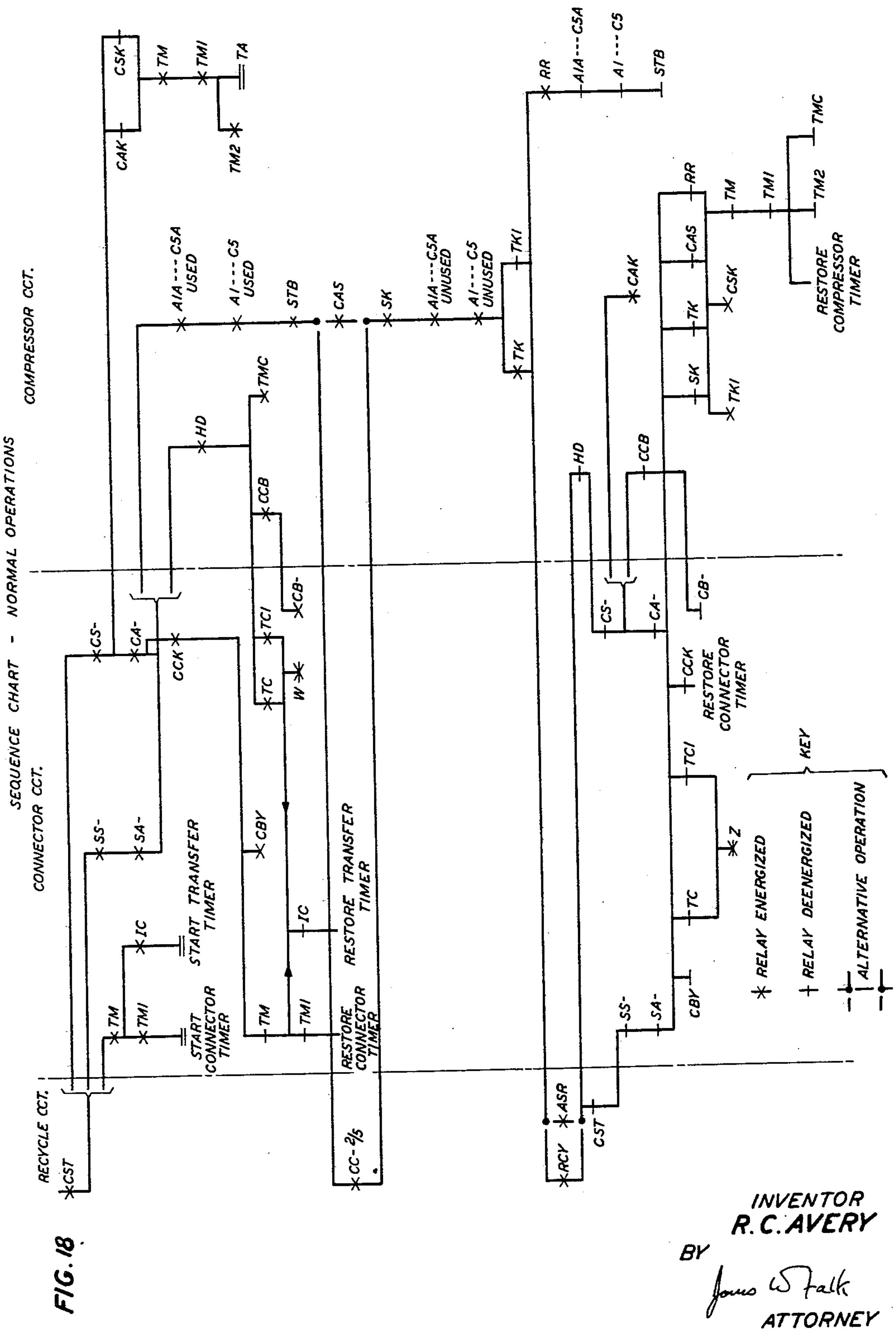
FIG. 18 is a sequence chart showing the normal sequence of operation of the disclosed circuitry upon receipt of a regular DDD call.

As a further aid in understanding the circuit operation of the illustrative embodiment a sequence chart is presented in FIG. 18. On this chart, time is represented as increasing from an initially zero time at the top to a subsequent time at the bottom; relays are indicated by their function designations and are physically disposed in accord with the portion of the circuit in which they operate; and the energization of a relay is depicted by an "X," whereas the deenergization of a relay is depicted by a line perpendicular to the sequence line. A more detailed understanding of the sequence chart may be had from the description hereinafter.

*General Circuit Functions*

The functions of various parts of the disclosure are illustrated in FIG. 2, which comprises those elements of a crossbar subscriber sender pertinent to the operation of the invention. A detailed description of these elements, their operation, and their interrelationships, may be obtained from Patent No. 2,235,803, granted March 18, 1941, to W. W. Carpenter, and Patent No. 2,867,690, granted January 6, 1959, to C. O. Parks. The disclosures of these patents are hereby incorporated by reference as though fully set forth herein.

FIG. 2 also illustrates a subscriber sender recycle circuit. This circuit initiates connection of its associated sender to a code compressor circuit and in addition operates under the control of the seized code compressor to inform a marker that the call is to a particular preselected area, or to some other area (including the local area).

Figure 4:
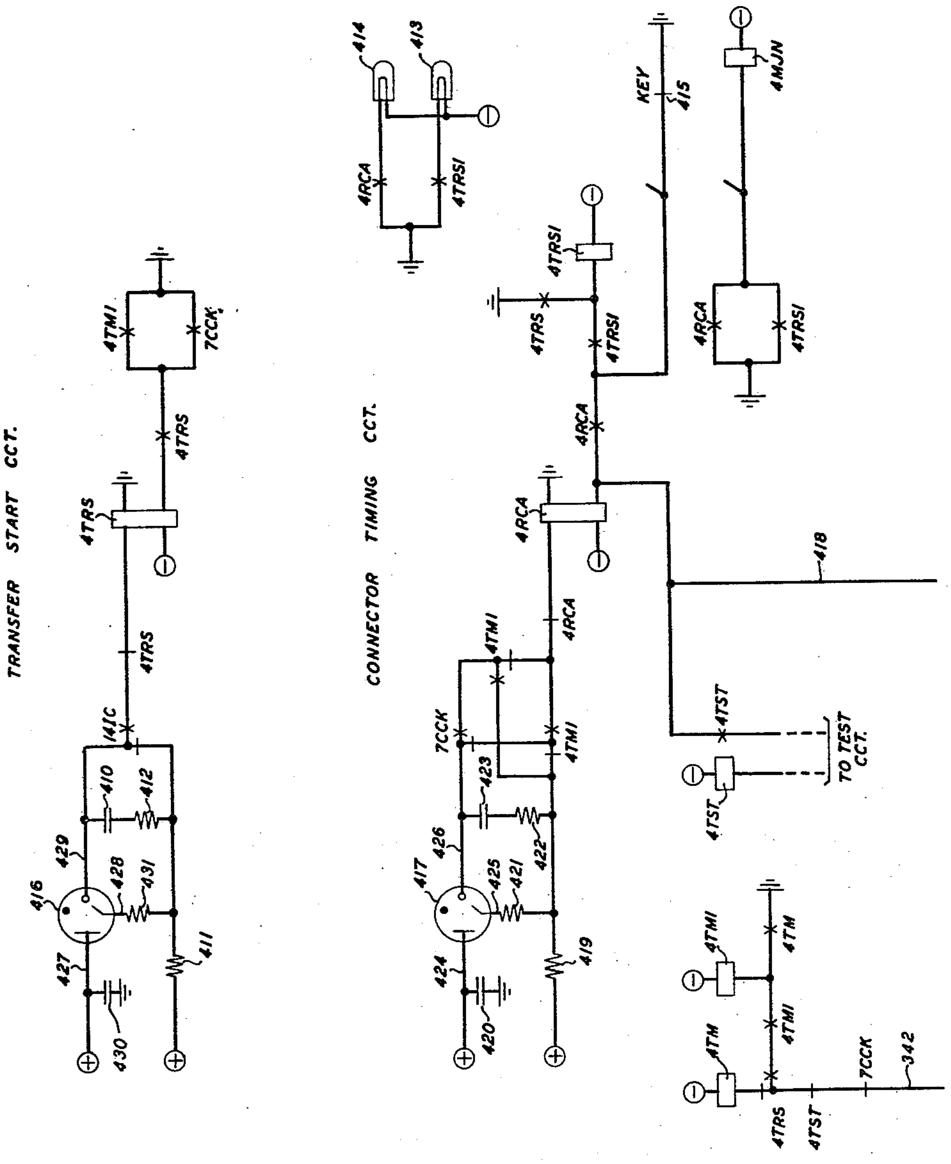
FIGS. 4–9, 14 and 17 are circuit schematics of portions of the connector circuitry.
Figure 7:
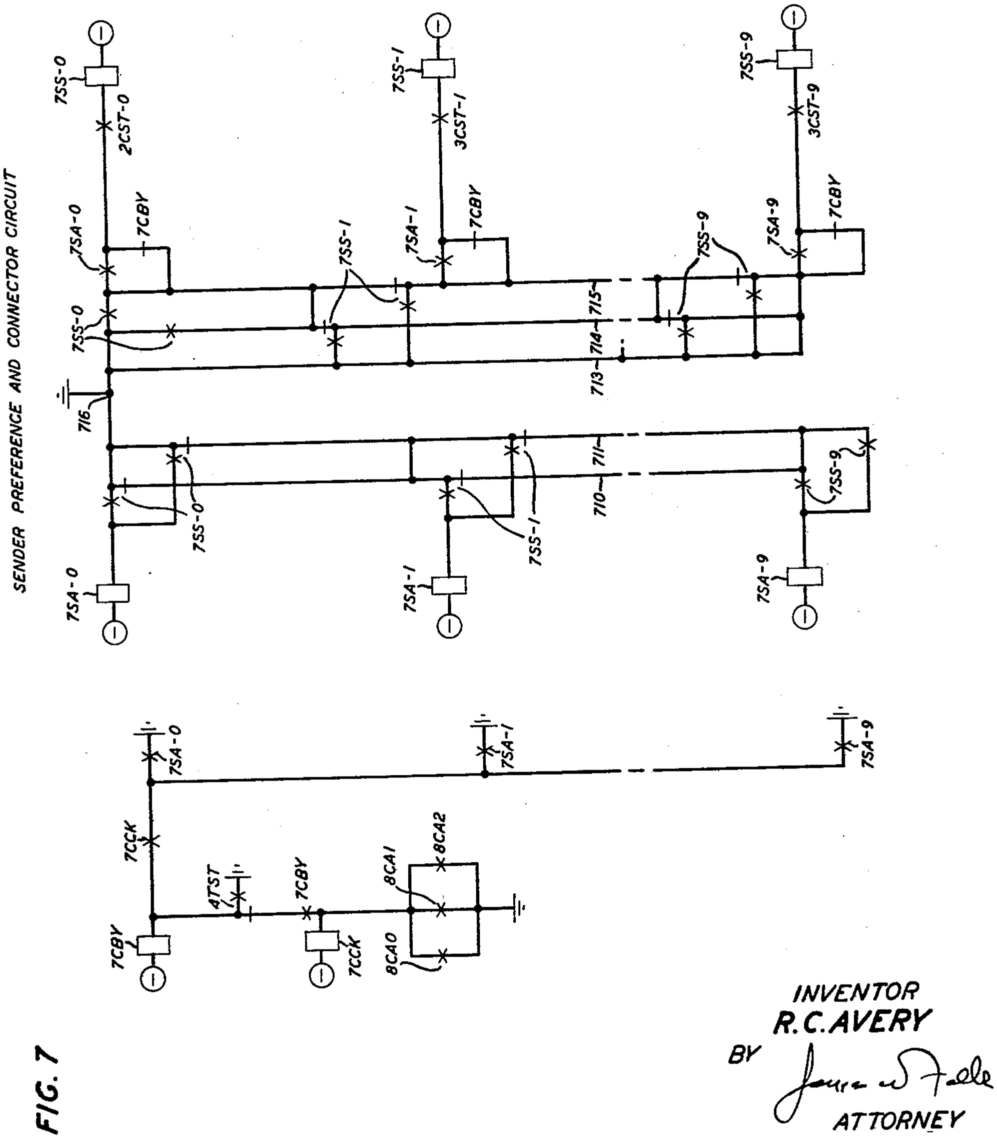
Figure 8:
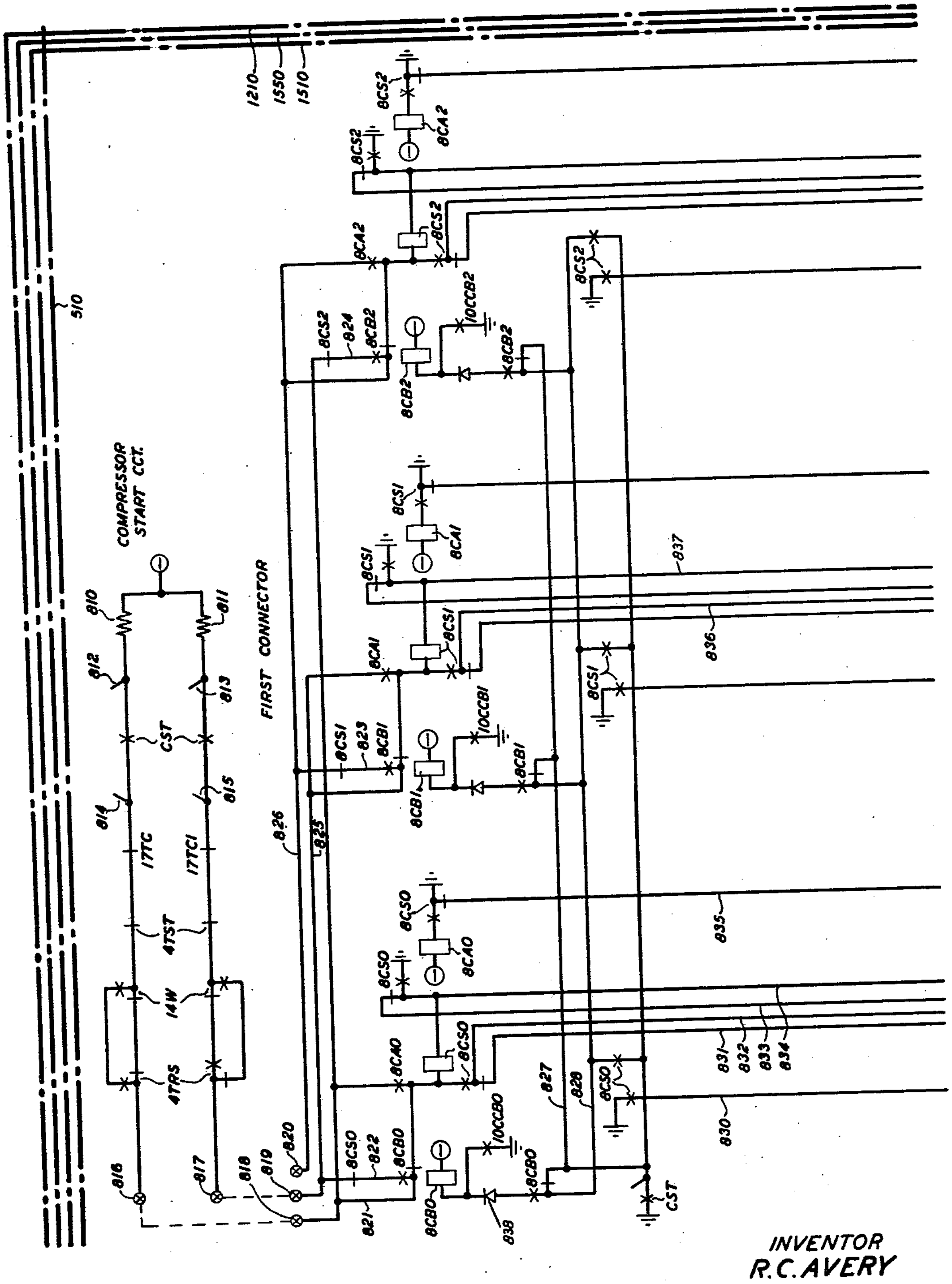
Figure 9:
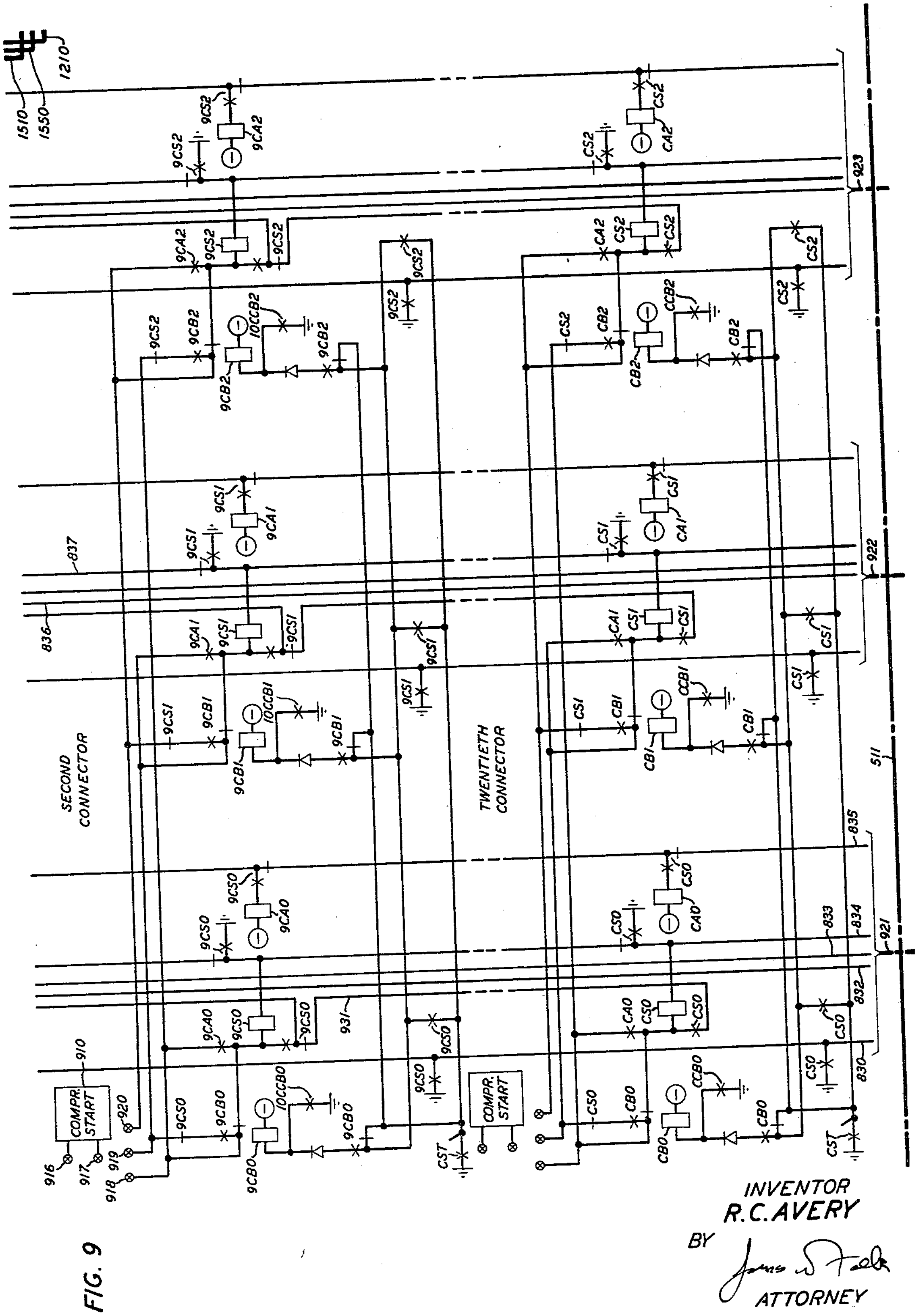
Figure 14:
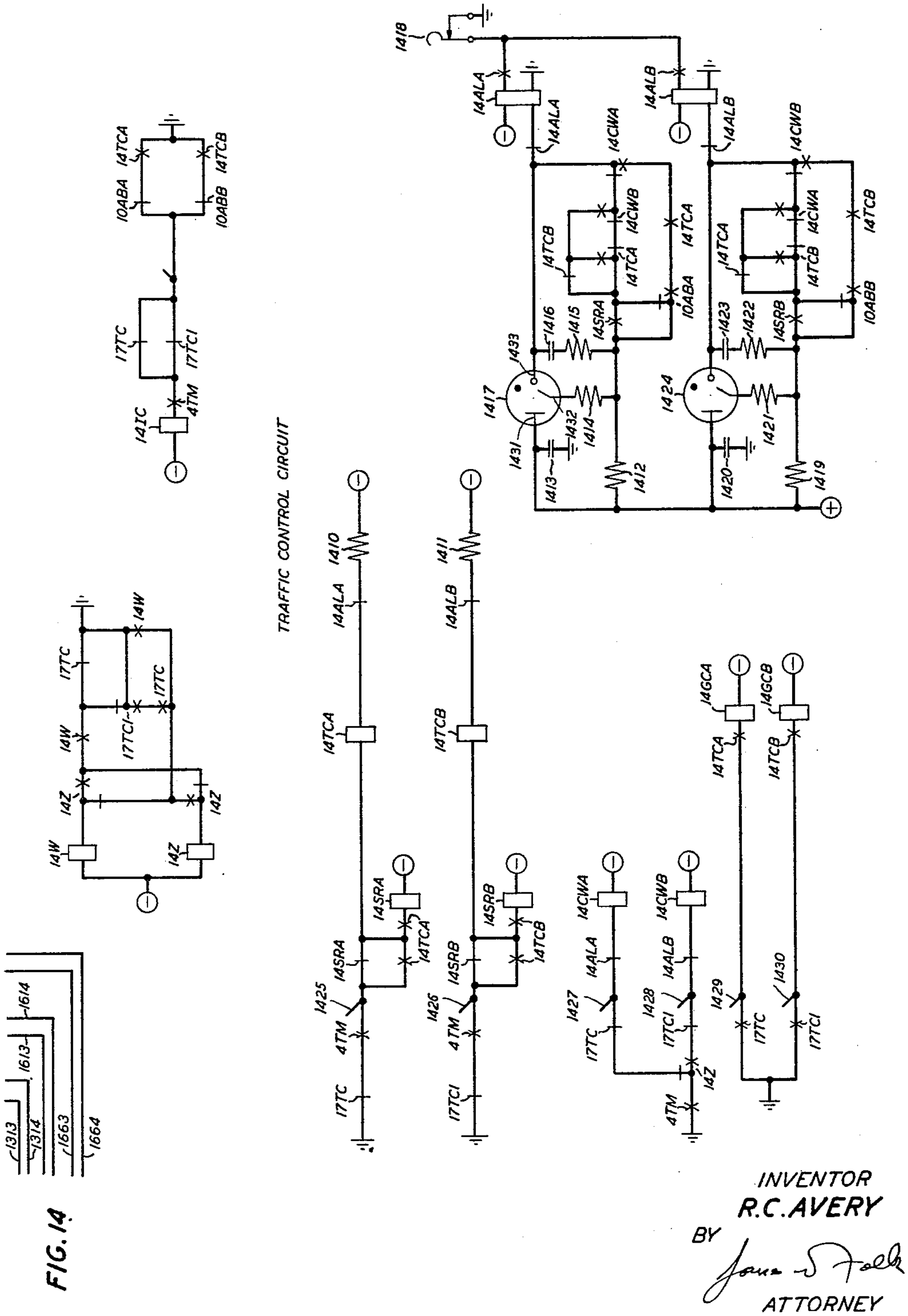
Figure 15:
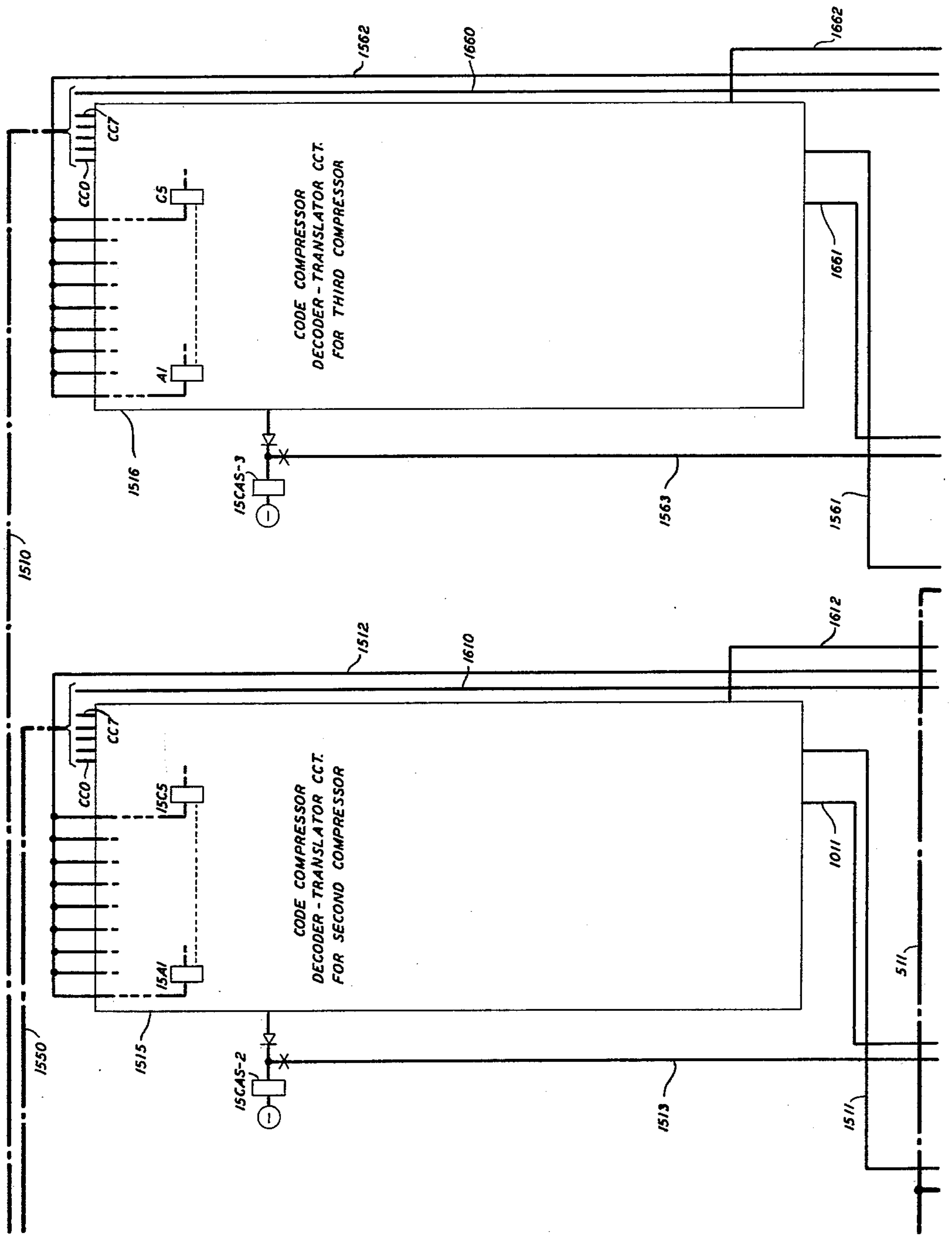
Figure 16:
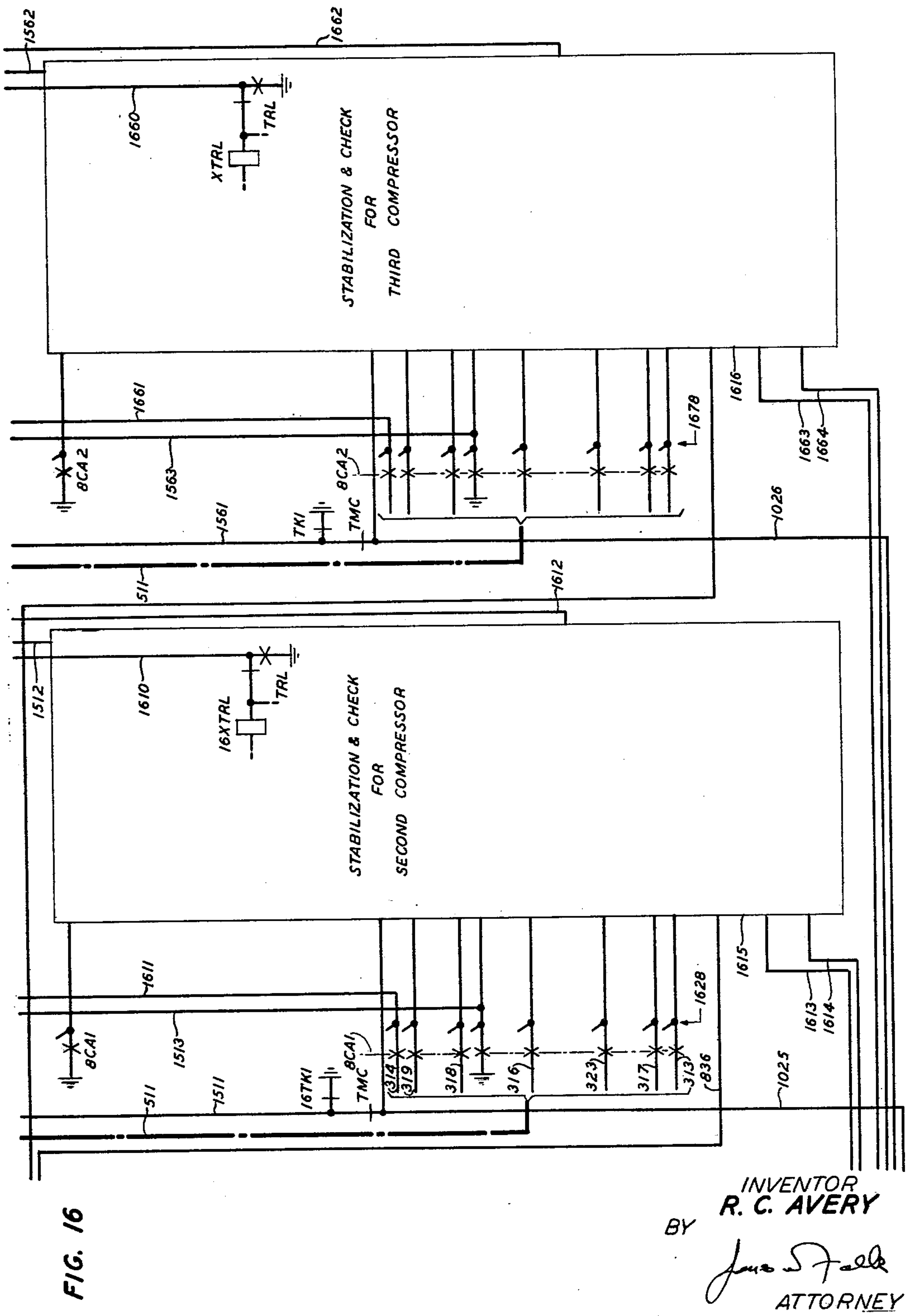
Figure 17:
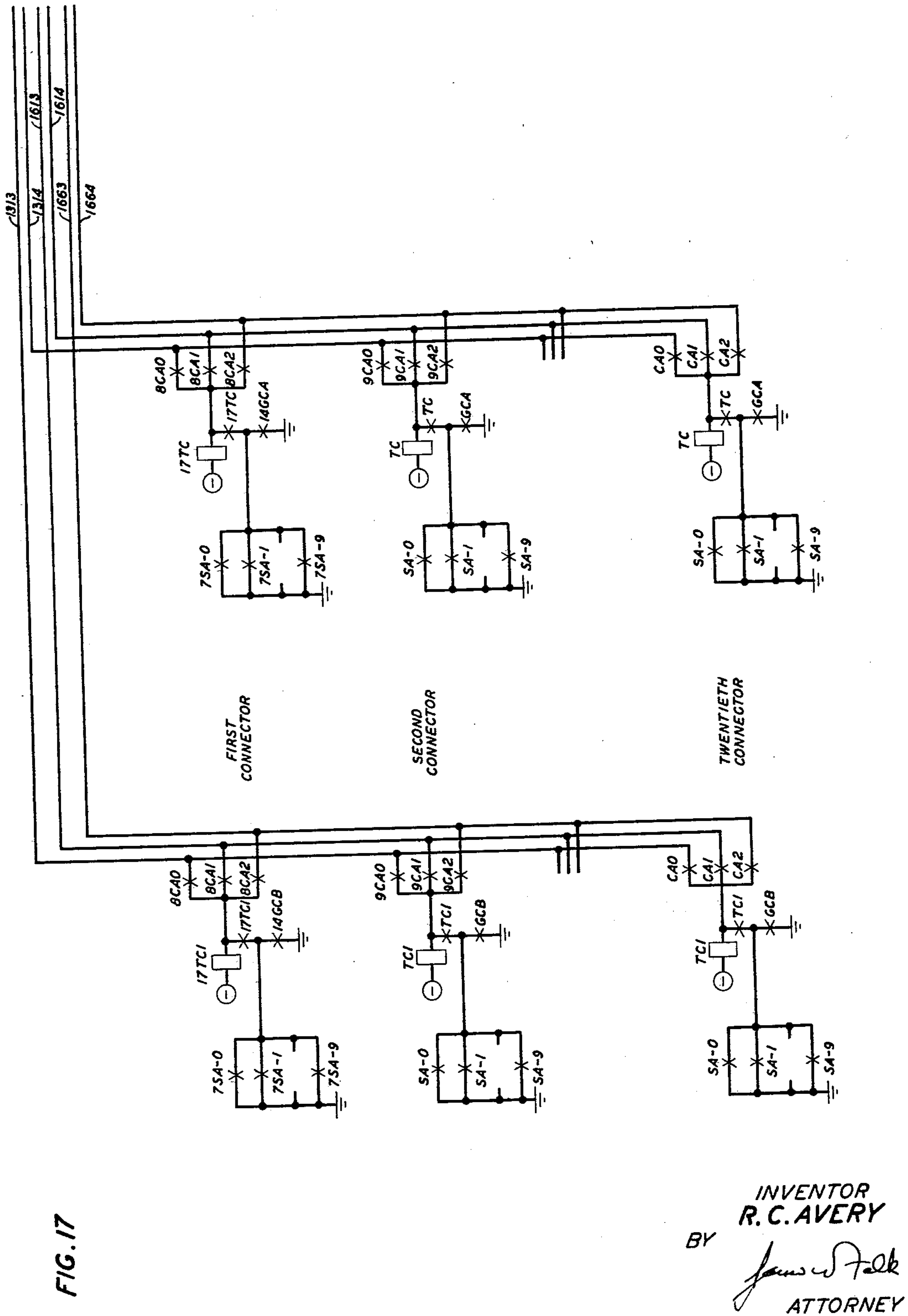

FIGS. 4–9, 14, and 17 show portions of the connecting circuits used in the invention. FIG. 4 discloses timing circuits used in monitoring the establishment of connections between sender recycle circuits and their connectors. FIGS. 5 and 6 show the contact arrangements which are responsible for establishing paths between the subscriber sender recycle circuits and a compressor. FIG. 7 discloses three typical stages of a ten-stage preference chain used to establish the order of precedence in which senders of the illustrated group will be served. FIGS. 8 and 9 show three typical connector control groups the function of which is to preferentially connect their associated connecting relays to an idle compressor. FIGS. 14 and 17 contain control circuitry associated with the connector circuits.

Figure 11:
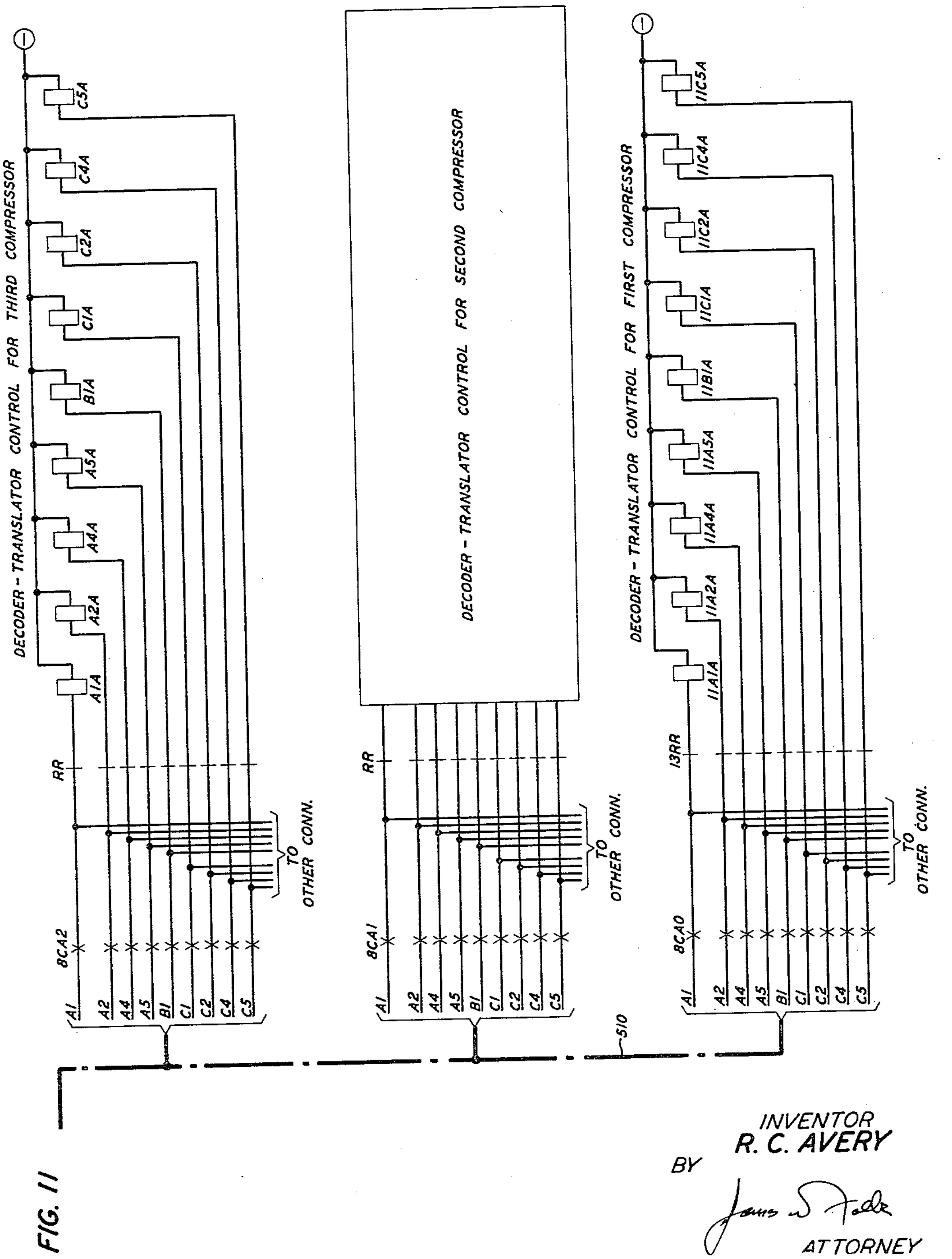
Figure 12:
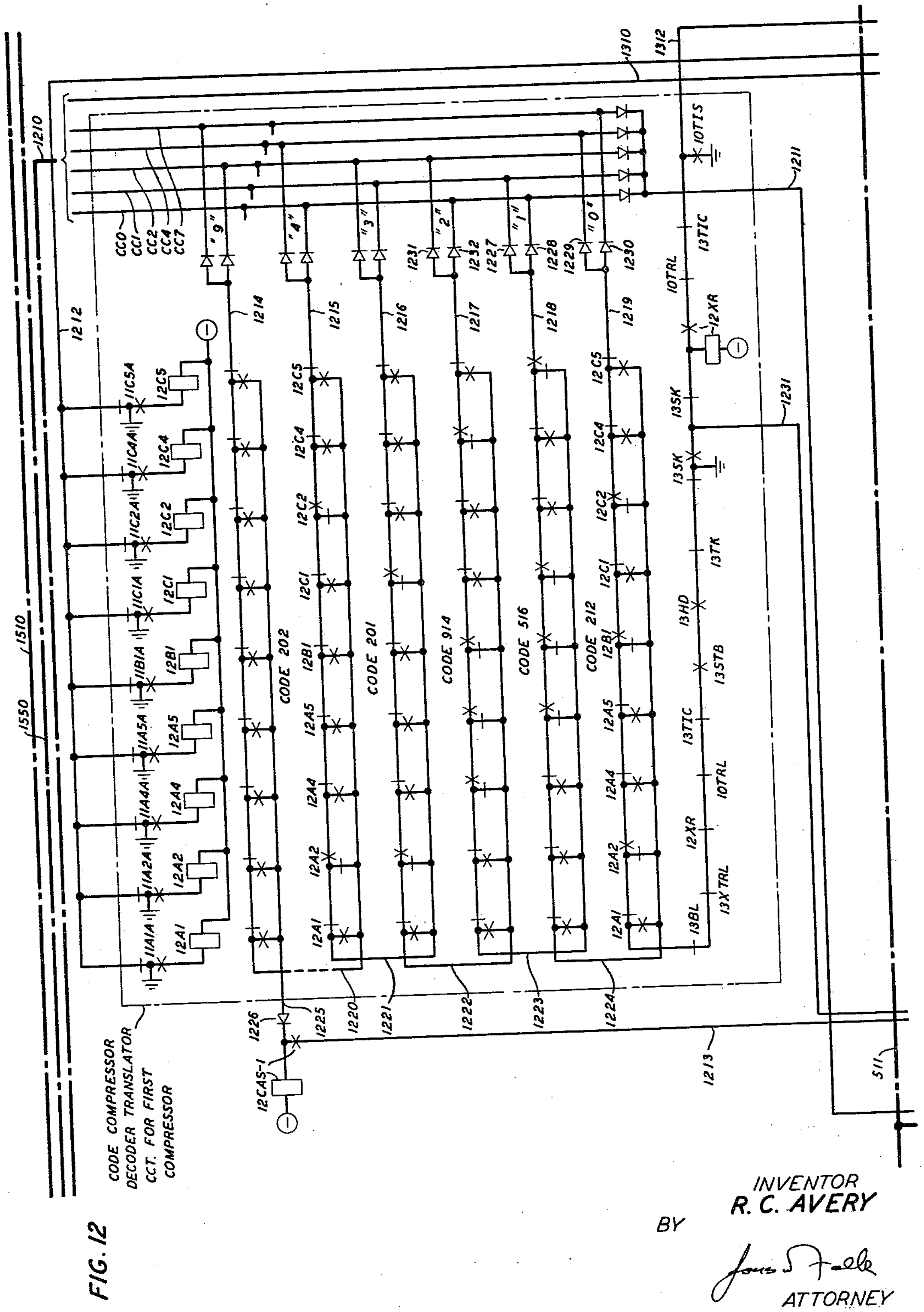

FIGS. 11 and 12 illustrate the component parts of the relay decoder-translating arrangement used herein. Each compressor contains one such arrangement, which in general is controlled and maintained by the circuits shown in FIG. 13. Busy indications and timing and alarm functions for each compressor are performed by the circuitry shown in FIG. 10.

*Operation on a Selected Area Call*

Figure 3:
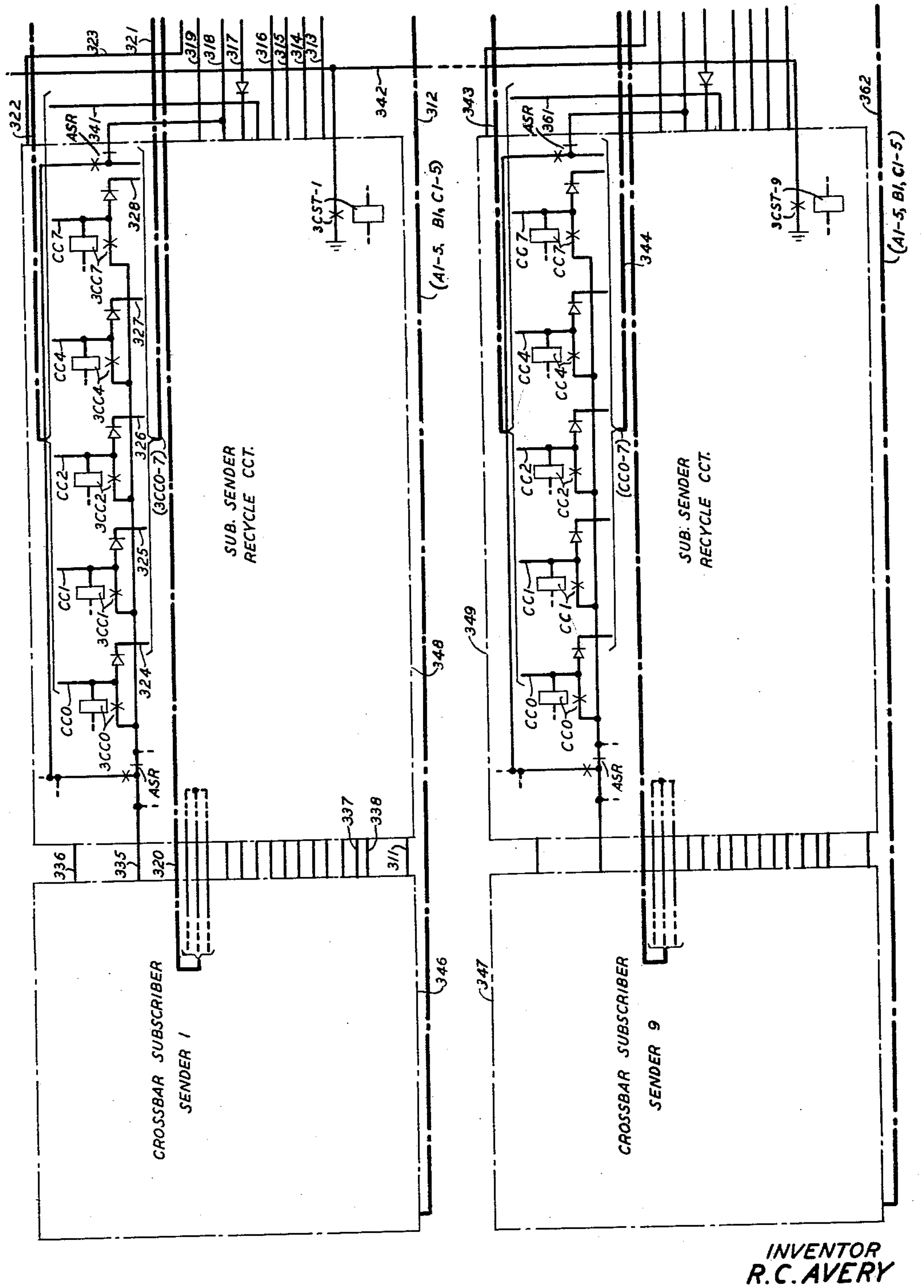

In order to describe the functioning of the circuit in response to a call, it will be assumed that the subscriber sender in FIG. 2 is the one into which an area code has been dialed. This subscriber sender is designated "crossbar subscriber sender 0." There are ten such senders in a group as shown in FIG. 3 by representing the second and last senders as boxes 346 and 347, respectively.

Registration of three digits in the registers of subscriber sender 0 causes the operation of the CL (3812) relay therein, as fully described in aforementioned Patent No. 2,867,690. In the event the B digit is either "0" or "1," the energizing ground applied to the winding of the CL (3812) relay is also applied through the "0" or "1" crosspoint of the B register, conductor 211, diode 229, normal contacts 2CC0, 2CC1, 2CC4, 2CC7, 2ASR, 2OFR, 2CST–0, 2TRL, and the winding of relay 2CST–0 to negative battery, operating relay 2CST–0.

Relay 2CST–0 establishes a holding path for itself comprising: negative potential, the winding thereof, normal contacts 2TRL, resistor 248, normal contacts 2OFR, 2ASR, 2CC7, 2CC4, 2CC1, 2CC0, diode 230, operated contacts 2CST–0, conductors 239 and 235, operated off-normal contacts ON1 and ground. Another holding path is established through normal contacts 2RCY, which are connected in parallel with the above-described 2CC– relays. Upon operation, relay 2CST–0, inserts resistance 248 in series with its winding. This is a common practice for preventing damage to the winding in the event that relay remains operated for an undue length of time. Similar protective circuitry is used throughout the present disclosure.

Operation of compressor start relay 2CST–0 simultaneously starts the recycle end of the connector circuit, the compressor end of the connector circuit, and a timing circuit.

*Selection of a Subscriber Sender*

Closure of the contacts 2CST–0 in FIG. 7 provides an operating path from negative potential through the winding of sender start relay 7SS–0, operated contacts 2CST–0, normal contacts 7CBY, through a preference chain (conductors 714 and 715) consisting of the normal contacts of the 7SS– relays associated with succeeding senders in the instant sender group, and over conductor 713 to ground at 716, operating relay 7SS–0. The preference chain is arranged in a conventional manner in order to give preference to the 7SS– relay closest to the "9" end. Thus, if the 3CST–1 relay associated with the subscriber sender shown in FIG. 3 where operated, it would preclude operation of relay 7SS–0 due to the operation of transfer contacts of relay 7SS–1 through which relay 7SS–0 must be grounded. In the event two senders bid for service by a connector simultaneously or within a short time interval, the circuitry, as developed, is fast enough to serve the sender having preference and then serve the second. The second sender in this case "holds-on" by maintaining its CST relay operated.

Operation of relay 7SS–0 closes an obvious locking path for itself and operates transfer contacts permitting establishment of an energization path from negative potential through the winding of relay 7SA–0, operated contacts of relay 7SS–0 to ground at point 716 operating relay 7SA–0. The 7SA– relays are connected in a preference chain which is directly opposed to that of the 7SS– relays. Thus, the operating path of a 7SA– relay is through the normal contacts of preceding 7SS– relays to ground, giving preceding 7SA– relays preference.

Operation of relay 7SA–0 closes a plurality of paths from the recycle circuit of sender 0 to the connector. This is shown in FIG. 5 wherein the normally open contacts appear in a plurality of connecting lines. The effect of operating relay 7SA–0 is to provide connection between cables 212 and 510 and between a plurality of recycle control leads and cable 511. The connections between the recycle circuit and connector, necessary for transmission of the digital information and the receipt of instructions in relation thereto, are now established. Simultaneously with the operation of any 7SS– relay, a start signal is applied by the compressor start circuit in FIG. 8 to an appropriate compressor start relay 8CS–, in order to effect seizure of a code compressor.

*Selection of a Code Compressor*

In order to minimize the holding time of a code compressor, a connector is activated to select a code compressor at the same time the sender preference circuit is selecting the sender that will be served. Thus, operation of relay 2CST–0 closes a path in the compressor start circuit from negative potential, through resistor 810, operated contacts 2CST–0, normal contacts 17TC, 4TST, 14W 4TRS, over the connection between points 816 and 818, normal contacts 8CB0, winding of relay 8CS0, conductor 834, normal CS0 contacts of all succeeding connectors, and normal contacts 12CAS–1, 13STB, 13SK, 13TK, 13RR, to ground. This results in the operation of relay 8CS0, which closes an obvious holding path for itself that is independent of the above ground. Note that a pair of normally open contacts in the described series circuit are designated "CST," although they were cited as "operated 2CST–0 contacts." In the circuit, as signified by break-off leads 812 and 814, contacts CST for each of the ten senders served by the first connector are in parallel at this point. Therefore, irrespective of which sender is being served, the corresponding CST contacts will activate the compressor start circuit. Note also, that the CS0 relays operate in a preference chain whereby the lattermost relays in the chain are given precedence.

Operation of relay 8CS0 opens chain circuits through the other CS0 relays, causing the release of normally operated check relays 10CAK and 10CSK.

Upon operation of relay 8CS0, closure of the 8CS0 contacts provides an operating path for relay 8CA0 from negative potential, through the windings thereof and operated 8CS0 contacts to ground. The connection of CA0 relays in each succeeding connector to ground, includes normal CS0 contacts of each preceding connector, thus once again preference is achieved.

Figure 13:
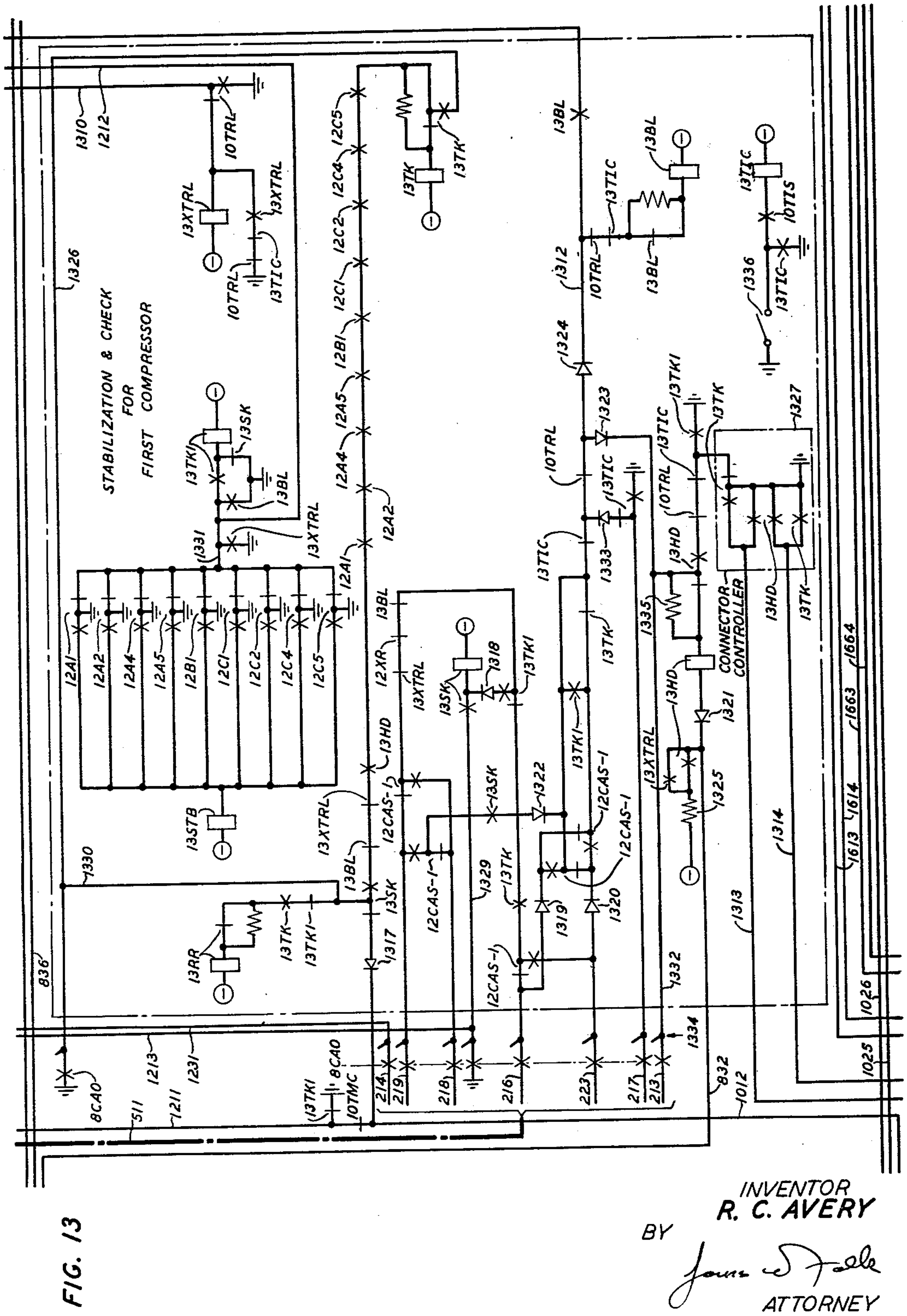

Operation of relay 8CA0 completes paths from cables 510 and 511 to the first code compressor of the group of three used. This compressor is illustrated in FIGS. 11, 12 and 13. Within the connector itself, energization of relay 8CA0 in combination with the energization of relay 7SA–0 causes the enablement of code compressor check relay 7CCK, and connector busy relay 7CBY; the former being energized in a circuit comprising negative potential, relay 7CCK, operated contacts 8CA0, and ground; and the latter being energized in a circuit comprising negative potential, relay 7CBY, operated contacts 7CCK and 7SA–0, and ground. Once relay 7CBY operates, it establishes a common connection between itself and relay 7CCK which is effective to insure continuous energization of both relays as long as either 8CA0 or 7SA–0 is operated.

Once relays 7SA–0 and 8CA0 have operated, establishing connection to a compressor, hold relay 13HD is energized therein. The operating path for relay 13HD comprises ground on the winding of relay CL (3812), operated "0" or "1" B register crosspoints, lead 211, diode 229, normal contacts 2CC0, 2CC1, 2CC4, 2CC7, 2ASR, 2OFR, operated contacts 2CST–0, lead 213, operated contacts 7SA–0, cable 511, lead 213 reappearing in FIG. 13, operated contacts 8CA0, lead 1332, normal contacts 13HD in parallel with current limiting resistor 1335, winding of relay 13HD, diode 1321, lead 832, operated contacts 8CS0 in FIG. 8, normal contacts 8CB0, and lead 821 to the negative potential appearing in the compressor start circuit.

Relay 13HD operates as a "hold" relay to provide an alternate energizing path for the compressor start relays and thereby release the compressor start circuit so that it may prepare for seizure of the other compressors to serve succeeding calls while the first is still being served. Closure of 13HD contacts in FIG. 13 establishes a path from negative potential through resistor 1325 and operated contacts 13HD to lead 832. The negative potential is thus applied through diode 1321, winding of relay 13HD, resistor 1335, operated contacts 13HD, normal contacts 10TRL and 13TIC, and normally operated contacts 13TK1 to ground; and also back over lead 832, operated contacts 8CS0 in FIG. 8, winding of relay 8CS0, and operated contacts 8CS0 to ground. Consequently, both relay 13HD and relay 8CS0 are held up by the negative potential applied to lead 832, and are no longer dependent upon the compressor start circuit.

Operation of relay 13HD in response to selection of a compressor, also causes energization of code compressor busy relay 10CCB0 in a circuit comprising negative potential, the winding thereof, operated contacts 13HD, and ground. In operating, relay 10CCB0 establishes an alternate holding circuit for itself from negative potential, through the winding thereof, lead 830, and operated contacts of the selected CS0 relay to ground. Relay 10CCB0 further furnishes an energizing circuit for the connector busy CBO relays of its associated compressor, as shown for example in FIG. 8 wherein relay 8CB0 is operated in a circuit including: negative potential, the winding thereof, operated contacts 10CCB0, and ground. Upon operation, relay 8CB0 creates its own holding path comprising negative potential, the winding thereof, diode 838, operated contacts 8CB0, 8CS0, and 2CST–0, and ground. In view of this holding path, connector busy relay 8CB0 will remain operated until both the compressor and the recycle and connector circuits release it, the former via compressor busy relay 10CCB0 and the latter via connector start relay 8CS0 or compressor start relay 2CST–0.

It will be recalled that the first compressor was found idle in the assumed sequence of operations. If this had not been the case, e.g., if another connector had seized the first code compressor, the compressor start circuit would have been connected to the second portion of the connector and consequently bid for association with the second compressor by attempting to operate relay 8CS1. The energization circuit for this second method of compressor seizure is: negative potential, resistor 810, operated contacts 2CST–0, normal contacts 17TC, 4TST, 14W, and 4TRS, terminals 816 and 818, lead 821, operated contacts 8CB0, normal contacts 8CS0, lead 825, normal contacts 8CB1, relay 8CS1, lead 837, normal contacts of the CS1 relays in all succeeding connectors, normal contacts 15CAS–2, STB, SK, TK, RR, and ground. Contacts 8CS0 in the described series circuit prevent a connector from association with two code compressors at once.

Obviously, if circumstances are such that both the first and the second code compressors are busy, the compressor start lead is transferred to the third compressor. Also, the alternate circuit path arrangement is wired to permit continuous search of all compressors until an idle one is found. Thus, if the second and third compressors are busy the first will be selected, even if the wiring between the compressor start circuit and the connector gives preference to the second compressor.

With reference to the holding path for relay 8CB0 to ground through operated contacts 2CST–0, hereinabove described, and the normal contacts of the 8CB– relays connected thereto, it will be noted that any 8CB– relay will be held operated if any other 8CB– relay is normal or if any 8CS– relay is operated. This arrangement is provided to prevent reversion to a more preferred compressor if one should become idle while a less preferred compressor is being seized.

*Operation of Code Compressor*

Returning to the consideration of the operations of the compressor in response to registration of digits in the sender, it will be understood that cable 510 comprises the leads from the A, B, and C digit registers in the subscriber sender which identify the individual digits. As is well known, and as is described in the aforementioned Carpenter patent, the ten characters possible for each digit are represented by discretely grounding particular ones of four leads for each digit. For convenience, the leads are designated by letter and number; the letter indicating the digit and the number indicating the numerical value of the lead, if grounded. Thus, the character "9" in the A digit register manifests itself by grounding leads A4 and A5. Only the B1 lead is needed from the B register because it is known that the B digit for area codes is either "0" or "1."

As previously mentioned, operation of relay 8CA0 extended the digit register leads to the selected compressor, which in the assumed case is the "first" compressor. Thus, the register leads depicted as going into cable 510 reappear in FIG. 11 wherein they are connected through operated contacts 8CA0 and normal contacts 13RR into the decoder-translator control circuits. It should be remembered, that although the decoder-translator control circuits for each code compressor are shown, the representative register leads from three illustrated senders of one group only are illustrated. It is understood that similar register leads from senders in other groups are similarly connected, as represented by the plurality of leads bracketed "to other connectors."

For description purposes, assume the area code received to be "914." This code manifests itself by grounding register leads A4, A5, B1, and C4. The ground on each of these leads is applied through operated contacts 8CA0, normal contacts 13RR, and windings of relays 11A4A, 11A5A, 11B1A, and 11C4A to negative potential, operating these relays.

Transfer contacts of the decoder-translator control relays provide a grounding path for operation of their associated decoder-translator relays at the upper portion of FIG. 12. Consequently, in response to area code "914" relays 12A4, 12A5, 12B1, and 12C4 operate. Representative transfer contacts of decoder-translator relays 12A1 through 12C5 inclusive comprise the major portion of FIG. 12. The contacts of each relay are vertically disposed below the winding thereof.

Unique interconnections between the contacts of the decoder-translator relays decode the area code to determine if it is one of a preselected group.

As illustrated in the present embodiment, a decoder-translator is designed to identify and translate ten distinct area codes. Transfer contacts of relays 12A1–12C5 are disposed in ten groups, each group containing a pair of transfer contacts from each relay. Each group is wired to provide a complete path from the upper left lead of the group, e.g. leads 1223 and 1224, to the upper right lead thereof, when a particular area code energizes the decoder-translator relays. Recognizing that in detached contact notation, stationary contacts of a transfer pair appear at the junction between the open and closed contact symbols, and front and back contacts appear at the opposite side of the open and closed symbols respectively, the contacts are connected as follows: the front contacts of relays operated for an assigned code and the back contacts of relays unoperated for that code are connected to the stationary contacts of immediately succeeding relays, or in the case of relay 12C5 to an output lead; the remaining back and front contacts are strapped together and connected to the 12A1 stationary contacts in the immediately succeeding group, or in the case of the tenth group, through diode 1226 and winding of relay 12CAS–1 to negative potential. For example, considering the "2" level in FIG. 12, which is wired for area code "914," it will be noted that transfer contacts 12A4, 12A5, 12B1, and 12C4 will be operated. The front contacts of these pairs and back contacts 12A1, 12A2, 12C1, and 12C2 are connected to the stationary contacts of immediately succeeding relays whereas the back contact of relay 12C5 is connected to lead 1217. Also, the remaining contacts are strapped together and connected via lead 1222 to stationary contacts of relay 12A1 in the "3" level.

With the described wiring arrangement a complete path from the input lead on contacts 12A1 to the output diodes to the right of any group is possible only when the area code for that group is impressed upon the decoder-translator relays. In all other cases, the circuit path is diverted to the strapped terminals and thence to the succeeding group. In the event the code is not one for which the translator is wired, the circuit path is diverted to the strapped terminals in each group in chain fashion and emerges at conductor 1225.

Returning to circuit operation upon connection of the digit register leads to the compressor, energization of relays 12A4, 12A5, 12B1, and 12C4 results in a path from negative potential, through the windings of stabilization relay 13STB and any operated contact of the aforecited decoder-translator relays, to ground. Relay 13STB has a minimum operate-time that is equal to the difference between the fastest and slowest operate-time of any relay in the 12A1–12C5 group. This insures that all appropriate relays of that group will be operated before the decoding and translating functions are attempted.

Operation of relay 13STB applies ground to the decoder-translator contacts via a path including normal contacts 13SK and 13TK, operated contacts 13HD and 13STB, and normal contacts 13TIC, 10TRL, 12XR, 13XTRL, and 13BL. As previously explained, this ground will be extended through closed contacts in the "0," "1," and "2" levels and emerge on lead 1217, thence via diodes 1231 and 1232 to conductors CC2 and CC0, respectively. Conductors CC2 and CC0 become part of cable 1210 and reappear in FIG. 5. The ground thereon is therefore applied through operated contacts 8SC0 and 7SS–0, cable 222, and the windings of compressed code relays 2CC2 and 2CC0 to negative potential.

Relays 2CC2 and 2CC0 operate and provide a locking path for themselves to ground through normal contacts 2ASR and operated contacts 2CST–0 in parallel, conductor 235, and operated off-normal contacts ON1 of the sender. Other compressed code relay contacts, illustrated below each relay of the 2CC0–2CC7 group, are interconnected to ground lead 219 whenever two relays of the group operate. The contact configuration is arranged to yield a trouble indication if less, or more, than two relays of the 2CC0–2CC7 group operate. Assuming no such trouble, the ground on lead 219 is applied to sender check relay 13SK over a path including: operated 7SA–0 contacts, cable 511, lead 219 reappearing in FIG. 13, operated 8CA0 contacts, normal contacts 12CAS–1, 13XTRL, 12XR, 13BL, operated contacts 13TK1, and diode 1318. Relay 13TK1 is normally operated in a circuit including negative potential, the windings thereof, and normal contacts 13SK to ground.

Relay 13SK operates and provides a locking path for itself from negative potential, through its windings and operated contacts, lead 1329, and operated 8CA0 contacts to ground.

*Reliability Check in Code Compressor*

At this point it will be noted that translation of the area code "914" has been made. However, it is possible that one or more of the decoder-translator relays required for the call failed to operate due to an open register lead. In order to verify the translation, a continuity check of all contacts of the decoder-translator is initiated upon energization of sender check relay 13SK. Operation of relay 13SK releases the ground, appearing at the bottom center of FIG. 12, previously applied via the operated contacts of the decoder-translator to the code compressor relay group, and applies that same ground through operated contacts 13SK, lead 1231, operated contacts 8CA0, lead 214, cable 511, lead 214 as it reappears in FIG. 5, operated contacts 7SA–0, lead 214 to lead 237, and through operated contacts 2CST–0 to lead 238. Leads 237 and 238 are interconnected with the A and B and C digit registers respectively, to transfer the ground thereon to all register leads not originally grounded by the area code registration. In the case being considered these leads are A1, A2, C1, C2, and C5. The new ground condition on the register leads is transferred via cable 212, operated 7SA–0 and 8CA0 contacts, and normal 13RR contacts to relays 11A1A, 11A2A, 11C1A, 11C2A, and 11C5A, causing them to operate. In turn, relays 12A1, 12A2, 12C1, 12C2 and 12C5 operate. Now, therefore, all decoder-translator relays should be operated.

Relays 12A1 to 12C5, as well as several others herein disclosed, are of a fast operate multi-contact variety in order to insure the completion of calls within the inter-digital time. The high currents which they require preclude operation in multiple under control of a single contact such as the contact of relay 13SK above, as it would be damaged thereby. Relays 11A1A to 11C5A, which are of higher resistance, are therefore employed to repeat the signals from the register leads.

To insure reliable operation, several checks are simultaneously made which are designed to prove whether or not all 11A1A–11C5A relays and all 12A1–12C5 relays are operated. Relay 13TK will operate only if all 12A1–12C5 relays are operated, and then over a path including negative potential, its winding and normal contacts, operated contacts 12C5–12A1 in series, operated contacts 13HD, normal contacts 13XTRL and 13BL, operated contacts 13SK, leads 1330 and 1326, and operated 8CA0 contacts to ground. Once operated, relay 13TK locks itself to lead 1326. Because each decoder-translator relay has a pair of contacts in series in the above-described operating circuit, operation of relay 13TK indicates the energization of every decoder-translator relay.

In order to guarantee that a shorted pair of contacts in the aforedescribed series chain does not give a false indication, an additional check is provided by relay 13TK1. This relay, under normal conditions, is operated between seizures of the code compressor with which it is associated. It will be noted that relay 13TK1 has a path when relay 13SK is unoperated through the normal contacts thereof, to ground. This path is supplemented prior to energization of relay 13SK by several paths: particularly, one from negative potential, through its windings and operated contacts, over lead 1212, and through normal contacts 11A1A–11C5A in parallel to ground; also, one from negative potential, through its windings and operated contacts, lead 1331, and through normal contacts 12A1–12C5 in parallel to ground. Consequently, only when all decoder-translator control relays and all decoder-translator relays are operated, will relay 13TK1 be released. Operation of relay 13TK and release of relay 13TK1 remove ground at their contacts from the winding of relay 13HD. This relay, however, remains operated due to ground on lead 213 from the recycle circuit.

*Recycling of Subscriber Sender Registers*

Operation of relay 13TK and release of relay 13TK1 indicates that the decoder-translator circuit is functioning properly and that the translated code is a valid one. At this time, therefore, the compressor circuit may be released. Because a preselected area code ("914") has been detected and compressed, recycle relay 2RCY will be operated to cause recycling of the A, B, and C registers preparatory to receiving the fourth, fifth, and sixth digits of the called destination. Relay 2RCY is energized over a path from lead 219 in FIG. 13, which previously was shown to be grounded by the code compression relays in the recycle circuit of FIG. 2. Continuing the circuit path from conductor 219 as it appears in FIG. 13, it comprises: normal contacts 12CAS–1, 13XTRL, 12XR, 13BL, and 13TK1, operated contacts 13TK, normal contacts 12CAS–1, operated contacts 8CA0, lead 216 in cable 511, operated 7SA–0 contacts in FIG. 5, lead 216 as it reappears in FIG. 5, normal contacts 2RCY and 2ASR, the winding of relay 2RCY and negative potential.

In operating, relay 2RCY opens the grounding path for the A(3816) and AA(3815) hold magnets in the subscriber sender thereby causing them to release. This release in turn, causes the release of the B and C hold magnets, as will be understood from a consideration of Patent 2,235,803. In this manner, the recycle of the A, B, and C registers is accomplished. Relay 2RCY also, in an obvious path, provides a ground to operate relay RA2 (3705) in the ssnder, which initiates reset of the digit directing mechanism so that the succeeding (fourth) digit is directed to the A register rather than to the "thousand" register. Relay 2RCY also further opens the DST (3106) relay ground lead in order to insure that the marker connector cannot be seized until the recycle process has been completed. To guarantee full release of the A(3816) and AA(3815) hold magnets and the recycling attendant thereupon, relay 2RCY locks to the grounds which originally had kept those magnets operated.

*Restoration of Code Compressor*

Coincidently with the operation of recycle relay 2RCY, the decoder-translator circuit is restored and prepared for operation in response to succeeding calls. Immediately following operation and release of translation check relays 13TK and 13TK1 respectively, which signals the completion of an accurate translation, register relay 13RR is operated. The energization circuit for relay 13RR comprises: negative potential, winding and normal contacts thereof, operated contacts 13TK, released contacts 13TK1, leads 1330 and 1326, and operated contacts 8CA0 to ground.

As illustrated in FIG. 11, opening of normally closed contacts 13RR disconnects the operating ground supplied to relays 11A1A–11C5A over the register leads A1–C5. Consequently, these relays are released and, in turn, release their associated 12A1–12C5 relays. When all relays of the decoder-translator group have released, stabilizing relay 13STB is deenergized by the removal of ground from its operating path. The decoder-translator is thus restored and available for service on subsequent calls.

While relay 2RCY is effecting the subscriber sender operations, the release of the recycle circuit is simultaneously taking place, initiated by release of compressor start relay 2CST–0 in response to the opening of normally closed contacts 2RCY in its energization path, the path parallel to these contacts comprising normal contacts of relays 2CC– having previously been opened. Release of relay 2CST–0 opens the operating path of sender start relay 7SS–0 which in turn opens the operating path of relay 7SA–0. Release of relay 7SA–0 opens one of the operating paths of connector busy relay 7CBY and of code compressor check relay 7CCK.

The same 2RCY contacts which open the energization circuit of relay 2CST–0 in FIG. 2 remove the ground from the energization circuit of hold relay 3HD, causing it to release. Release of relay 13HD, in turn, removes the holding potential from lead 832 and therefore causes deenergization of compressor start relay 8CS0.

Release of relay 8CS0 has a multiple effect in that: it effects the opening of the operating path of its associated relay, 8CA0; it reestablishes the ground on lead 835 which allows chain check relay 10CAK to return to an operated state; and it opens the holding path of code compressor busy relay 10CCB0, returning it to an unoperated state. Upon release, relay 10CCB0 opens the grounding path of all connector busy relays (CB0).

Because speed of operation is essential in the instant circuitry, it will be recalled that many operating paths are established from two ends of the connector at once. This technique is also used to accelerate the break-down time of the circuitry after it has performed its function. Release of relay 8CA0 severs connections between the compressor and connector and in so doing further disconnects the operating paths of many relays already deenergized, or in the process of deenergization, because relays 7SS–0 and 7SA–0 are also released. The relays so affected include 7CBY and 7CCK. Release of relay 8CA0 also causes deenergization of sender check relay 13SK, translator check relay 13TK, and register release relay 13RR.

Once relay 13SK is restored, translator check relay 13TK1 reoperates in a circuit comprising negative potential, the winding thereof, normal contacts 13SK, and ground. Chain-check relay 10CSK will also resume its energized state following release of the above-described relays in a circuit comprising negative potential, the winding thereof, lead 833, normal contacts of all CS0 relays, lead 834, normal contacts 12CAS–1, 13STB, 13SK, 13TK, and 13RR, and ground.

*Alternation of Code Compressor Start Leads*

Throughout the circuit description, it will be observed that many means are provided for alternative paths of access to the three compressors. This, of course, is essential in view of many subscriber senders being serviced. There is extensive use of preference arrangement in order to facilitate the objective of fair allotment of compressor time to each group of senders. Because, by its very nature, a preference arrangement results in increased use of the particular unit preferred, that unit tends to receive extra wear. To obviate the effect of this condition, straps are provided for connecting the compressor start circuits to the connectors, rather than permanent circuit paths. These straps are changed in accordance with any regular schedule in order to insure variations in the particular compressors having initial and secondary preference.

In addition to this manual means of obtaining equalization of code compressor use, the compressor initially preferred in each instance is alternated under the control of the compressor start circuit. Preparation of the compressor start circuit for subsequent calls is initiated under control of traffic control relays 17TC and 17TC1. Operation of relay 13HD closes similar operating paths for both the 17TC and 17TC1 relays. Choosing the path for relay 17TC1 as a matter of convenience, it will be seen to comprise: negative potential, the winding of relay 17TC1, operated contacts 8CA0, lead 1313, operated contacts 13HD and ground. Both relay 17TC and relay 17TC1 lock to ground over paths including operated contacts 17TC and 17TC1, respectively, and any operated 7SA– contacts of the sender group served by the first connector.

The compressor start circuit in FIG. 8 has two distinct legs, or circuit branches, emanating from a common negative potential. The upper circuit branch contains normally closed 17TC contacts and the lower branch contains normally closed 17TC1 contacts. Thus, the compressor start circuit is opened upon energization of these traffic control relays. While holding the compressor start circuit open, relays 17TC and 17TC1 change the branch of the circuit that will be operative on the succeeding call by activating relay 14W. Obviously, operation of transfer contacts 14W in the compressor start circuit will result on the succeeding call, in the application of negative potential to terminal 817 rather than 816 as was assumed in the instant case.

Upon operating, relay 14W creates a locking path for itself comprising negative potential, the winding thereof, normal contacts 14Z, operated contacts 14W, and ground. Except under certain conditions, as explained hereinafter, when the compressor has performed its functions and releases the associated connector, relays 17TC and 17TC1 are deenergized due to release of relays 7SA–0 and 8CA0. At that time an operating path is provided for relay 14Z which consists of negative potential, the winding thereof, normal contacts 14Z, operated contacts 14W, normal contacts 17TC, and ground. Once operated, relay 14Z is retained energized over the following circuit: negative potential, the winding thereof, operated contacts 14Z and 14W, and ground. Relay 14W is also kept operated in a circuit including negative potential, the winding thereof, operated contacts 14Z and 14W, normal contacts 17TC, and ground. Thus, while selecting a compressor for a second area code, relay 14W will be operated and therefore the compressor start circuit will initially attempt to establish association with a compressor via terminals 817 and 819, as illustrated.

Following the seizure of a compressor for the second call, relays 17TC and 17TC1 will operate and open the energization circuit of relay 14W. The effect of this, as previously noted, is to change the start path over which the compressor will be selected for the third call. Upon release of the compressor following service of the second call, the deenergization of relays 17TC and 17TC1 opens the operating circuit of relay 14Z.

Upon the request for a compressor, initiated by a third call, the 14W–14Z circuit will have returned to the state initially assumed and the above-described alternating cycle will thereafter continue.

*Operation of a Non-Selected Area Call*

In the event the area code registered is not one of the preselected group, the decoder-translator circuit will so determine, and cause operation of relay 12CAS–1. In such a case, all of the described operations for seizing a compressor will take place upon detection of the "0" or "1" digit in the B digit register of the sender. As previously described, operation of relays 13STB and 13HD establishes a circuit from ground to the decoder-translator contact chains. This circuit includes: normal contacts 13SK and 13TK, operated contacts 13HD and 13STB, and normal contacts 13TIC, 10TRL, 12XR, 13XTRL, and 13BL. Because the area code is not of the preselected group, the contact configuration will successively divert the ground condition to succeeding chains until it reaches conductor 1225 and therefore permits energization of call-auxiliary-sender relay 12CAS-1. Relay 12CAS-1 operates and establishes a holding circuit for itself comprising negative potential, the winding and operated contacts thereof, lead 1213, operated contacts 8CA0, and ground.

It will be recalled that in the case of a preselected area code, the decoder-translator operated appropriate relays in the compressed code group 2CC0-2CC7 and thereby established a ground on lead 219. Since in this case, a non-preselected area code is being handled, relays 2CC0-2CC7 will not be operated; instead, ground will occur on lead 218 due to normal contacts 2CC0, 2CC1, 2CC2, 2CC4, and 2CC7. This ground condition permits energization of sender check relay 13SK via a path comprising: lead 218, cable 511, lead 218 as it reappears in FIG. 13, operated contacts 8CA0 and 12CAS-1, normal contacts 13XTRL, 12XR, 13BL, operated contacts 13TK1, diode 1318, and winding of relay 13SK to negative potential. Relay 13SK operates and locks to a holding path comprising negative potential, the winding and operated contacts thereof, lead 1329, operated contacts 8CA0, and ground.

Relay 13SK, in operating, establishes ground on lead 1231 as previously described, and simultaneously removes the ground from the decoder-translator contact chain. By grounding lead 1231, the checking process is initiated wherein all previously unused register leads of the sender are grounded and the operation of all relays 11A1A-11C5A and 12A1-12C5 is checked. Assuming proper operation of the decoder-translator, relay 13TK will operate and relay 13TK1 will release, both over paths previously traced.

Once relays 13TK and 13TK1 have operated and released, respectively, the ground appearing on lead 218 in FIG. 13 is extended over the following circuit to permit operation of relay 2ASR; operated contacts 8CA0, 12CAS-1, normal contacts 13XTRL, 12XR, 13BL, 13TK1, operated contacts 13TK, 12CAS-1, 8CA0, lead 223, cable 511, lead 223 as it reappears in FIG. 5, operated contacts 7SA-0, diode 233, and winding of relay 2ASR to negative potential. Relay 2ASR operates, and establishes a holding path for itself comprising negative potential, the winding and operated contacts thereof, lead 235, operated off-normal contacts ON1 in the subscriber sender, and ground.

Relay 2ASR also creates an obvious energizing path for relay AS in the subscriber sender, the operation and functions of which are more fully described in aforementioned Patent 2,867,690. Relay AS is used to connect an auxiliary sender to the subscriber sender in order to handle the call with equipment currently in use.

Coincident with the operation of relay 2ASR, register release relay 13RR operates in a circuit comprising negative potential, winding and normal contacts thereof, operated contacts 13TK, normal contacts 13TK1, leads 1330 and 1326, operated contacts 8CA0, and ground. As previously described, the decoder-translator relays are returned to normal under control of relay 13RR.

After performing its function of calling for an auxiliary sender to service the incoming call, relay 2ASR initiates breakdown of the interconnections between the recycle circuit, connector, and code compressor. By opening the energization paths of relay 2CST-0 in the lower right corner of FIG. 2, the 2ASR contacts cause relay 2CST-0 to release, and at the same time remove ground from relay 13HD causing it to release. Deenergization of the connecting and control relays follows according to the sequence of operation already described, and, consequently, the code compressor circuit and connector are made available for subsequent use.

It may be noted that in the instant case the regular operation of a subscriber sender equipped with auxiliary sender apparatus was only momentarily interrupted, and that the interruption permitted translation of the area code in order to determine that an auxiliary sender was required.

*Protection and Trouble Indication Circuits*

The described sequence of operations illustrates the circuit functioning under ideal conditions. Because two hundred subscriber senders are being served by only three code compressors, it is absolutely essential that close supervision be maintained over the circuit to immediately detect failure or malfunctions and provide alternate service or alarms. The present embodiment contains a plurality of timing circuits which allot a predetermind period within which particular operations must be performed. If these operations are not completed within the allotted period, a check is initiated and, if possible, alternate provision is made for handling the call in progress. The present embodiment also provides continuously active relay check circuits which monitor various sub-circuits to detect false grounds or opens which might lead to an improper code translation and compression. Although some checking and precautionary techniques are inherent in the circuits, as designed, e.g., the double contact and lead arrangement in the sender preference circuit of FIG. 7, others will now be described.

*Transfer-Start Circuit*

To guard against failure due to a false open condition in one of the leads of the compressor start circuit, a transfer-start circuit is provided. After a preselected period of time has elapsed, if a compressor has not been seized by the connector, the compressor start leads are changed and bidding for a compressor by means of an alternate start lead is initiated.

A transfer-start circuit, such as illustrated in FIG. 4, is provided for each connector. The basic components of this circuit are gas tube 416, timing elements 410 and 411, transfer contacts 14IC, and transfer relay 4TRS. During idle periods, normal contacts 14IC shunt capacitor 410 and resistor 412 and consequently the same potential is applied to anode 427, control anode 428, and cathode 429. The timing period begins when transfer contacts 14IC remove the shunt. The values of resistors 411 and 412, and capacitor 410 are chosen to provide an exponential timing wave that yields a potential difference between control anode 428 and cathode 429, that is equal to the ignition potential after a relatively short delay, for example, 80 milliseconds. Thus, tube 416 is ionized 80 milliseconds after timing commences and transfer start relay 4TRS is energized. In this way, the compressor start leads may be changed, and a bid for association with another compressor initiated, before a fourth digit is dialed into the subscribed sender.

Considering the cycle of operation of the transfer-start circuit, it will be seen that upon operation of relay 14IC, transfer contacts 14IC removed the short across resistor 412 and capacitor 410 and establish a ground on the upper plate of capacitor 410. The ground is applied via relay 4TRS, normal contacts thereof, and operated contacts 14IC. Capacitor 410 charges in a path comprising positive potential, resistors 411 and 412, capacitor 410, operated contacts 14IC, normal contacts 4TRS, relay 4TRS, and ground. Upon lapse of the preselected timing period, control anode 428 reaches ionization potential with respect to cathode 429 and tube 416 fires. It may be noted that resistor 431 is a limiting resistor of large magnitude and that resistor 412 is of small magnitude in relation to either resistor 431 or resistor 411. Consequently, the potential applied to control anode 428 is substanially that appearing on the lower plate of capacitor 410. Ionization of gas tube 416 creates an energization circuit for relay 4TRS comprising: positive potential, gas tube 416, operated contacts 14IC, normal contacts 4TRS, relay 4TRS, and ground. Upon operating, relay 4TRS removes ground from the upper plate of capacitor 410 and provides a holding circuit for itself consisting of negative potential, its lower winding and operated contacts, contacts 4TM1 and 7CCK in parallel, and ground.

Operation of relay 4TRS is effective, as illustrated in the compressor start circuit in the upper portion of FIG. 8, to transfer the start voltage to a different lead, and thus to a different compressor start relay. If, as previously assumed, the first attempt to seize a compressor took place over the upper circuit branch, the operation of relay 4TRS results in closing the lower branch and opening the upper one. The start circuit is now: negative potential, resistor 811, operated contacts 2CST–0, normal contacts 17TC1, 4TST, and 14W, operated contacts 4TRS, terminals 817 and 819, lead 825, normal contacts 8CB1, relay 8CS1, lead 837, normal contacts of all succeeding CS1 relays, normal contacts 15CAS–2, STB, SK, TK, RR, and ground. Relay 8CS1 operates, and in accordance with previously described operations, the second compressor will be seized.

In addition to effecting the transfer of the code compressor start leads, relay 4TRS establishes an obvious operating path for transfer-start-auxiliary relay 4TRS1. Upon operating, relay 4TRS1 establishes a locking path for itself via key 415, causes energization of major alarm relay 4MJN in an obvious circuit, and lights indicator lamp 413. Attendants will appraise this situation to determine whether or not additional action need be taken.

It will be recalled that the transfer start timing operation was initiated by operation of relay 14IC. The operation of this relay is indicative of the coincident occurrence of several conditions, namely: (1) a bid for association with a compressor has been made; (2) no compressor has been seized: (3) an idle compressor is available; (4) a major alarm condition has not occurred. Each of the above factors is assured by inclusion of the following contacts in the series energization circuit for relay 14IC: 4TM, 17TC in parallel with 17TC1 and 10ABA and 14TCA in parallel with 10ABB and 14TCB. The specific circuitry accomplishing the aforementioned results will now be considered.

(1) Time measuring relay 4TM is an integral part of the connector timing circuit to be described subsequently. At this point it need merely be pointed out that it is energized immediately following the operation of compressor start relay 2CST–0 over a path comprising, negative potential relay 4TM, normal contacts 4TRS, 4TST, and 7CCK, leads 342 and 240, operated contacts 2CST–0, and ground. Closure of contacts 4TM is indicative of the request of a subscriber sender for a code compressor.

(2) Traffic control relays 17TC and 17TC1 are associated with the first connector (counterparts appearing for each connector) and are energized following the operation of hold relay 13HD over similar paths comprising, negative potential, relay 17TC or 17TC1, operated contacts 8CA0, lead 1314 or 1313, operated contacts 13H0 in parallel with contacts 13TK, and ground. Because hold relay 13HD, as previously described, is energized upon seizure of its associated compressor, operation thereof indicates seizure. Since relays 17TC and 17TC1 are controlled by relay 13HD, their operation will occur only if a compressor is seized. Consequently, placement of normally closed contacts 17TC and 17TC1 in the energization circuit of relay 14IC insures operation thereof only if a compressor has not been seized.

(3) All-busy relays 10ABA and 10ABB are located at the right-center of FIG. 10. Their energization path includes the series connection of normally open contacts associated with each code compressor busy relay 10CCB0, 10CCB1, and 10CCB2. Thus, in order to operate either 10ABA or 10ABB all code compressors must be in use. The normally closed contacts 10ABA and 10ABB connected in parallel in the energization circuit for relay 14IC insure its operation only if an idle code compressor is available. It should be noted that normally open contacts of slow-release relays 14SRA and 14SRB are in the series energization path of relays 10ABA and 10ABB, respectively. As will be shown in the following, relays 14SRA and 14SRB are generally operated in the time period between bidding for a code compressor and the establishment of a connection thereto.

(4) Traffic control relays 14TCA and 14TCB are energized in similar paths. Considering relay 14TCA for convenience, it will be seen that its operating circuit comprises negative potential, resistor 1410, normal contacts 14ALA, relay 14TCA, normal contacts 14SRA, operated contacts 4TM, normal contacts 17TC, and ground. Due to the presence of the 4TM contacts, relay 14TCA will only operate between the period of bidding for a code compressor and establishment of a connection thereto. The presence of contacts 14ALA insures operation only if a major alarm has not occurred due to a trouble condition in the corresponding controls.

Upon operation, relay 14TCA establishes an operating path for relay 14SRA and an alternate operating path for itself. The former circuit comprises negative potential, relay 14SRA, a pair of operated contacts 14TCA, operated contacts 4TM, normal contacts 17TC, and ground; and the latter circuit comprises negative potential, resistor 1410, normal contacts 14ALA, relay 14TCA, operated contacts 14TCA and 4TM, and normal contacts 17TC. Obviously, if relay 14TCA or 14TCB is operated a corresponding major alarm has not occurred and consequently the normally open contacts thereof in the energization circuit of relay 14IC impose this condition on the operation of relay 14IC. If relays 14TCA and 14TCB are both normal, trouble is indicated in connection with both branches of the compressor start circuit and relay 14IC does not operate, as the transfer start feature under these conditions would not be effective.

In summation, the transfer start circuit functions to time the seizure of a code compressor. If seizure does not occur within a preselected interval and an idle compressor is available, the circuit transfers the start leads in order to initiate a bid for a compressor by means of an alternate lead.

*Connector Timing Circuit*

An alarm circuit is provided in the present embodiment to protect against an unusually long delay between the request for association with a connector and the actual connection, and between the seizure of a compressor and the release thereof following decoding and translation. A single timing circuit, illustrated in FIG. 4, is used to perform these functions. As seen, the basic elements of the connector timing circuit are: gas tube 417, RC timing components 419, 422 and 423, triggering contacts 4TM1 and 7CCK and request-connector-alarm relay 4RCA.

Initially, gas discharge tube 417 is non-conducting because all elements therein are at essentially the same potential. Upon operation of relay 2CST–0, however, an obvious energization circuit for time-measure relay 4TM is created, causing it to operate and subsequently causing relay 4TM1 to operate. Operation of relay 4TM1 removes the shorting path previously bridging resistor 422 and capacitor 423 and grounds cathode 426 of tube 417, the ground being applied via relay 4RCA, normal contacts 4RCA, operated contacts 4TM1, and normal contacts 7CCK. Under these conditions capacitor 423 begins to charge in a circuit comprising positive potential, resistors 419 and 422, capacitor 423, normal contacts 7CCK, operated contacts 4TM1, normal contacts 4RCA, relay 4RCA, and ground. Resistor 421 is substantially larger than resistor 422 and resistor 419 is larger than either. The charge appearing at the bottom plate of capacitor 423 is applied to control anode 425. The time constant of the RC circuit is selected to cause a potential of ionization magnitude between control anode 425 and cathode 426 within a period of time roughly equivalent to the minimum interdigit time. When tube 417 fires, relay 4RCA is operated in a circuit comprising ground, its winding and normally closed contacts, operated contacts 4TM1, normal contacts 7CCK, tube 417 and positive potential.

Energization of relay 4RCA results in operation of the major alarm relay 4MJN and ignition of signal lamp 414, both over obvious paths, and also the establishment of a locking path through normally closed key 415. Operation of the major alarm will obviously invite further attention.

Under normal conditions, before the connector timing period has expired, the circuit connections will have advanced to the point that a compressor has been seized and code compressor check relay 7CCK operated. It may be recalled that this occurs immediately following energization of any CA– relay. From the standpoint of the connector timing circuit, operation of relay 7CCK has two results. First, it opens the grounding path that initiated the timing operation and thereby restores the timing circuit to normal. Second, it releases time-measure relay 4TM by severing the ground thereto supplied over lead 342. Release of relay 4TM removes the operating ground of relay 4TM1 and consequently it too is released.

Deenergization of relay 4TM1 in conjunction with energization of relay 7CCK is distinctly indicative of seizure of a code compressor. It is important that the time a code compressor is tied up with any one connector is kept to a minimum; therefore, the connector timing circuit is again activated to monitor the duration of seizure. This time, cathode 426 is grounded via a path comprising operated contacts 7CCK, normal contacts 4TM1, normal contacts 4RCA, and relay 4RCA. In the event the code compressor does not complete the functions of decoding and translation before the connector timing circuit times out, the previously mentioned alarm indications will arise. Once again, however, under normal operating conditions the code compressor will have completed its mission and released the connector long before the timing period has expired. This release manifests itself by deenergization of code compressor check relay 7CCK which, in turn, re-establishes the short across timing capacitor 423 and resistor 422, and removes the ground from cathode 426.

Recapitulating, the function of the connector timing circuit is to yield an alarm if either the connector takes too long to seize a code compressor, or the connector seizes a code compressor and takes too long before releasing it.

*Code Compressor Timing and Alarm Circuits*

In addition to the timing and alarm circuits associated with each connector, there are similar circuits individual to each compressor. These circuits are designed to give an alarm and also to "freeze" the operation of the compressor in order to permit trouble analysis, whenever a predetermined maximum time elapses without release of the compressor. Typical failures guarded against by the code compressor protection circuitry include: any falsely open path preventing completion of a call; crossed or grounded receiving leads, detected by relay 12XR; blocked recycle control due to false grounding of a recycle circuit control lead, detected by relay 13BL; crossed or grounded trouble release leads, detected by relay 13XTRL; and false ground on the CC– leads while the compressor is idle, detected directly by the timing circuit. Whenever any of the mentioned difficulties arise, the compressor timing and alarm circuit is maintained in an activated condition and following a predetermined interval, trouble analysis means are summoned.

With the basic operation of the illustrated embodiment in mind, the operation of each of the cited detection relays whenever a ground is placed on their operating path is obvious, consequently a detailed description will not be given. It is important to note, however, that after operating, thereby signaling an abnormal condition, each relay establishes its own holding path whereby either automatic test equipment or an operator may readily determine exactly where the abnormality arose.

The timing function for compressor trouble indications is performed by the circuitry illustrated in the lower half of FIG. 10. This circuit is designed to commence timing under a plurality of conditions to summon aid in the event these conditions are not alleviated within a period of time approximately one-third of a minimum interdigit interval. Timing is initiated by energization of time-measure relay 10TM and consequently may be initiated by operation of any one of relays 13XTRL, 13BL, 12XR, 13SK, 13HD, 13STB, 12CAS–1, 13TK, or 13RR. Note: operation of the first relays of this list is indicative of a trouble condition, whereas operation of the latter relays is indicative of seizure of the compressor by a connector.

Timing may also be started from other sources such as the ground connections through normal contacts 10CAK and 10TMC, 10CSK and 10TMC, and ground connected to lead 1012 by contacts 13TK1 or from the CC– leads. Relay 10TMC is operated upon operation of relay 13HD and is released when the timing circuit actuating ground is removed, thereby releasing relay 10TM1 or 10TIS. The function of relay 10TMC is to delay reclosure of certain timing circuit control ground connections to insure full restoration of the timer between compressor seizures.

Assuming normal operations, relay 10TM is operated initially over a path comprising negative potential, its own windings, normal contacts 10TM1, 10TIS, operated contacts 13HD, and ground. Upon operation, relay 10TM shunts out the aforementioned 10TM1 contacts and energizes relay 10TM1 in an obvious circuit. Operation of relay 10TM1 energizes relay 10TM2 and starts the timing circuit.

The basic components of the timing circuit are gas discharge tube 1018 and RC timing circuit 1017, 1015, 1013. As in the case of previously discussed timing circuits, the elements of tube 1018 are normally at the same positive potential due to a shorting path across the timing capacitor 1017. This short is removed upon operation of relay 10TM1 at the same time that a ground is established on cathode 1029. The ground is derived via time-alarm relay 10TA, operated contacts 10TM1, and normal contacts 10TIS. Capacitor 1017, therefore, charges in a circuit comprising positive potential, resistors 1013 and 1015, normal contacts 10TIS, operated contacts 10TM1, relay 10TA, and ground. Resistor 1013 is substantially larger than resistor 1015 and, consequently, the voltage at the control anode 1028 clearly follows the exponential charging curve. When the ionization voltage is reached, tube 1018 fires and an operating path is established for time-alarm relay 10TA, comprising positive potential, tube 1018, normal contacts 10TIS, operated contacts 10TM1, relay 10TA, and ground.

Upon operating, time-alarm relay 10TA closes an operating path for trouble-indication-start relay 10TIS comprising negative potential, the winding thereof, normal contacts 10TIS, operated contacts 10TM1, and 10TA, and ground. The function of relay 10TIS is to give an alarm indication, and summon automatic equipment which may be furnished to investigate trouble conditions. Relay 10TIS locks up to whatever ground connections were originally employed to operate relay 10TM. Energization of relay 10TIS opens the operating paths of both relays 10TM and 10TA, causing them to release and, in turn, release relays 10TM1 and 10TM2. Release of relay 10TM1 while relay 10TIS is operated restarts the timer in a circuit which is obvious in light of the previous description.

After a trouble check has been made, trouble-indication-complete relay 13TIC is energized, either manually or automatically, by closing illustrative switch 1336 in the lower right quadrant of FIG. 13. At this point of operation, it is acknowledged that the code compressor circuit is not functioning properly. In order to prevent loss of the call without customer knowledge, overflow request relay 2OFR is energized. The operating circuit for relay 2OFR under these conditions is: negative potential, the winding thereof, diode 231, lead 217, operated contacts 7SA0, cable 511, lead 217 reappearing in FIG. 13, operated contacts 8CA0, operated contacts 13TIC, and ground. Relay 2OFR locks to ground on conductor 235.

Operation of relay 2OFR effects deenergization of compressor start relay 2CST–0 by opening its operating path in the lower right corner of FIG. 2. Restoration of relay 2CST–0 to normal closes the grounding path for marker start relay DST (3106) in the subscriber sender. Relay DST (3106) then operates in an obvious path and, as fully described in aforecited Patent No. 2,235,803, the marker or decoder is connected to establish connections for the call in accordance with the digits stored in the A, B and C registers.

As noted in Patent No. 2,235,803, relay SM3 (3702) is operated each time a digit is registered, and released thereafter. Consequently, energization of relay 2OFR while relay DST (3106) is operated makes possible a grounding path for overflow relay OF (4206) upon registration of the third digit. The grounding path comprises released contact SM3, lead 243, diode 232 and operated contacts 2OFR.

Turning again to Patent No. 2,235,803, it will be seen that operation of relay OF (4206) is followed by energization of auxiliary overflow relay OF1 (4203) and trial relay TR1 (3108). Trial relay TR1 (3108) operates and functions to disconnect marker start relay DST (3106) and subsequently energize trial TR2 (3109). In operating relay TR2 (3109) reoperates relay DST (3106) and a second marker is connected. This marker examines leads 3134, 3048, and 3133, (so identified in Patent No. 2,235,803) and finds ground on leads 3134 and 3133 due to operation of relays TR2 (3109) and 2OFR. This grounded condition is uniquely identified with request for overflow and the subscriber is therefore apprised, either by an overflow signal or overflow announcement that the call has not gone through.

A more detailed description of the specific relay operations and funcetions is available in the cited patent.

Recall that the trouble, in the assumed case, occurred after the code compressor was seized, consequently relays 2CST–0 and 13HD were operated, along with the other relays controlled thereby. Relay 2OFR removes the operating ground from these relays and the connector and code compressor are restored to normal as described for a regular call. When the sender restores to normal, relay 2OFR releases due to the obvious opening of its locking path. The circuit is thus available for subsequent calls.

The material hereinbefore has disclosed an illustrative embodiment of a code compression concept applied to the control of switching equipment used to direct calls of the direct-distance-dialed variety. This embodiment provides means for utilizing existing equipment which has insufficient capacity to operate efficiently on such calls. It also provides economical means for utilizing equipment in existence, but not employed by the present auxiliary apparatus. The code compression arrangement described, however, may be employed with minor modifications for similar treatment of other signals without departing from the invention taught herein.

What is claimed is:

1. A telephone switching system responsive to multi-digit called line numbers preceded by a plurality of area identification digits, comprising first register means for storing said area identification digits, translating means for providing discrete outputs representative of preselected pluralities of said identification digits and providing a further output representative of all other pluralities of said area identification digits, and means responsive to said discrete outputs for recycling said first register means to store digits of said calling line numbers.

2. A telephone switching system as defined in claim 1 further comprising auxiliary register means, and means responsive to said further output for connecting said auxiliary register means to receive and store digits of said called line numbers.

3. A telephone switching system responsive to sequentially received destination identifying digits, wherein called areas are designated by a plurality of digits preceding the exchange and line identifying digits, comprising a plurality of subscriber senders, each having individual registers for storing each digit as it is received, detecting means in each sender operative to detect the storage of area identifying digits therein, a plurality of decoding means for distinguishing preselected area identifying digits and responsive thereto to produce outputs discretely representative thereof, connecting means responsive to a group of said subscriber senders operative upon storage of said area identifying digits to selectively connect the sender storing said digits to one of said decoding means, auxiliary registers, control means in said subscriber sender controlled by said connected decoding means when said preselected area identifying digits are not detected for connecting the subscriber sender to said auxiliary registers, storage means individual to each subscriber sender and operative under the control of said connected decoding means when said preselected area identifying digits are detected for storing said discretely representative outputs, and recycling means individual to each subscriber sender and operative under the control of said connected decoding means when said preselected area identifying digits are detected to restore said individual registers before subsequent digits are received.

4. A telephone switching system as defined in claim 3 wherein said decoding means comprises a timing circuit set to initiate checking operations upon elapse of a preselected time interval, checking means for automatically monitoring the progress of the decoding operation and creating conditions distinctly representative thereof, means effective upon connection of said decoding means to a subscriber sender to activate said timing circuit, and test means controlled by said timing circuit to ascertain the condition of said checking means upon elapse of said preselected time interval.

5. A telephone switching system responsive to sequentially received destination identifying digits, wherein called areas are designated by a plurality of digits preceding the exchange and line identifying digits, comprising a plurality of groups of subscriber senders, each sender having individual registers for storing each digit as it is received, detecting means in each sender operative to detect the storage of area identifying digits therein, a plurality of decoding means for distinguishing preselected area identifying digits and responsive thereto to produce outputs discretely representative thereof, a connector individual to each group of senders, first preference means activated by said detecting means for selectively connecting each subscriber sender storing digits to an associated connector, second preference means activated by said detecting means and operative simultaneously with said first preference means for selectively connecting said associated connector to a decoding means, auxiliary registers, control means in said subscriber sender controlled by said connected decoding means when said preselected area identifying digits are not detected for connecting the subscriber sender to said auxiliary registers, storage means individual to each subscriber sender and operative under the control of said connected decoding means when said preselected area identifying digits are detected for storing said discretely representative outputs, and recycling means individual to each subscriber sender and operative under the control of said connected decoding means when said preselected area identifying digits are detected to restore said individual registers before subsequent digits are received.

6. A telephone switching system responsive to sequentially received destination identifying digits, wherein called areas are designated by a plurality of digits preceding the exchange and line identifying digits, comprising a plurality of subscriber senders, each having individual registers for storing each digit as it is received, detecting means in each sender operative to detect the storage of area identifying digits therein, a plurality of decoding means for distinguishing preselected area identifying digits and responsive thereto to produce outputs discretely representative thereof, connecting means responsive to a group of said subscriber senders operative upon storage of said area identifying digits to connect the sender storing said digits to a preselected one of said decoding means, means operative upon failure of said connecting means to establish said connection within a predetermined time for controlling said connecting means to establish a connection between said sender storing digits and a second preselected decoding means, storage means individual to each subscriber sender and operative under the control of said connected decoding means when said preselected area identifying digits are detected for storing said discretely representative outputs, and recycling means individual to each subscriber sender and operative under the control of said connected decoding means when said preselected area identifying digits are detected to restore said individual registers before subsequent digits are received.

7. A telephone system wherein call routing is responsive to area code designations comprising a first plurality of sequentially received digits and line address code designations comprising a second plurality of sequentially received digits; comprising means for registering each digit of said first plurality, translating means responsive to the registration of certain preselected ones of said area code designations, and means controlled by said translating means and operative before the receipt of said second plurality of digits for simultaneously recycling each of said registering means to receive said second plurality of digits.

8. A telephone system wherein call routing is responsive to area code designations comprising a first, a second, and a third digit and line address code designations comprising a plurality of digits which includes a fourth, a fifth, and a sixth digit, said first, second, third, fourth, fifth, and sixth digits being sequentially received; comprising individual means for registering said first, said second, and said third digit respectively, decoding means operative when a predetermined one of said registered first, second, and third digits is of a predetermined character, said decoding means producing discrete outputs when said registered digits represent certain preselected ones of said area code designations and an additional output when said registered digits represent any other of said area code designations, and means responsive to said discrete outputs for simultaneously resetting said individual registering means to store said fourth, fifth, and sixth digits respectively.

9. A telephone switching system in accordance with claim 2 further comprising second register means discretely associated with said first register means for storing said discrete outputs.

10. A telephone switching system in accordance with claim 8 further comprising means discretely associated with said resetting means and responsive to said decoding means for storing said discrete outputs.

References Cited in the file of this patent

UNITED STATES PATENTS

| | | |
|---|---|---|
| 2,691,157 | Stuart-Williams et al. | Oct. 5, 1954 |
| 2,702,380 | Brustman et al. | Feb. 15, 1955 |
| 2,721,990 | McNaney et al. | Oct. 25, 1955 |
| 2,824,910 | Scowcroft | Feb. 25, 1958 |
| 2,867,690 | Parks | Jan. 6, 1959 |
| 2,918,535 | Leonard et al. | Dec. 22, 1959 |
| 2,928,903 | Bellamy et al. | Mar. 15, 1960 |
| 2,957,168 | Dempsey et al. | Oct. 18, 1960 |
| 2,959,775 | Marcus | Nov. 8, 1960 |
| 2,965,718 | Avery | Dec. 20, 1960 |